US006579575B2

(12) United States Patent
Emch

(10) Patent No.: US 6,579,575 B2
(45) **Date of Patent: *Jun. 17, 2003**

(54) MULTI-STAGE PROCESSES FOR COATING SUBSTRATES WITH LIQUID BASECOAT AND POWDER TOPCOAT

(75) Inventor: Donaldson J. Emch, Goodrich, MI (US)

(73) Assignee: Industries Ohio, Inc., Cleveland, OH (US)

( * ) Notice: Subject to any disclaimer, the term of this patent is extended or adjusted under 35 U.S.C. 154(b) by 130 days.

This patent is subject to a terminal disclaimer.

(21) Appl. No.: 09/840,573

(22) Filed: Apr. 23, 2001

(65) Prior Publication Data

US 2002/0015801 A1 Feb. 7, 2002

Related U.S. Application Data

(63) Continuation-in-part of application No. 09/320,264, filed on May 26, 1999, now Pat. No. 6,221,441.

(51) Int. Cl.[7] ............................ B05D 1/38; B05D 3/06; B05D 3/02; B29C 71/02; B29C 71/04

(52) U.S. Cl. ....................... 427/542; 427/521; 427/189; 427/202; 427/379; 427/378; 427/388.1; 427/393.5

(58) Field of Search ................................ 427/542, 384, 427/388.1, 386, 379, 378, 410, 409, 189, 202, 521, 393.5

(56) References Cited

U.S. PATENT DOCUMENTS 1,998,615 A 4/1935 Groven .......................... 91/70
2,377,946 A 6/1945 Leary ............................ 18/19

(List continued on next page.)

FOREIGN PATENT DOCUMENTS

| | | |
|---|---|---|
| DE | 19642970 | 4/1997 |
| EP | 0038127 | 3/1981 |
| EP | 0148718 | 11/1984 |
| GB | 2091859 | 8/1982 |
| WO | WO 98/40170 | 9/1998 |

OTHER PUBLICATIONS

"Infrared Flash Oven" Brochure, BGK Automotive Group 1989, no month.

(List continued on next page.)

*Primary Examiner*—Marianne Padgett
(74) *Attorney, Agent, or Firm*—William J. Uhl

(57) ABSTRACT

Processes for coating metal or polymeric substrates are provided which include the steps of: (a) applying a liquid basecoating composition to a surface of the metal substrate; (b) applying a first infrared radiation at a power density of 30 kilowatts per meter squared or less and a first air simultaneously to the basecoating composition for a first period of at least about 30 seconds, a first velocity of the air at the surface of the basecoating composition being about 4 meters per second or less, a first temperature of the metal substrate being increased at a first rate ranging from about 0.05° C. per second to about 0.3° C. per second to achieve a first peak metal temperature ranging from about 30° C. to about 60° C., such that a pre-dried basecoat is formed upon the surface of the metal substrate; (c) applying a second infrared radiation and a second air simultaneously to the basecoating composition for a second period of at least about 15 seconds, a second velocity of the air at the surface of the basecoating composition being about 4 meters per second or less, a second temperature of the metal substrate being increased at a second rate ranging from about 0.4° C. per second to about 1.2° C. per second to achieve a second peak metal temperature of the substrate ranging from about 60° C. to about 80° C., such that a dried basecoat is formed upon the surface of the metal substrate; and (d) applying a powder topcoating composition over the dried basecoat.

31 Claims, 3 Drawing Sheets

U.S. PATENT DOCUMENTS

| | | | | | |
|---|---|---|---|---|---|
| 2,387,516 | A | | 10/1945 | Kaminski | 219/34 |
| 2,472,293 | A | | 6/1949 | Groven | 34/60 |
| 2,478,001 | A | | 8/1949 | Miskella | 219/35 |
| 2,498,339 | A | | 2/1950 | Miskella | 91/55 |
| 2,876,135 | A | | 3/1959 | Levine | 117/76 |
| 3,151,950 | A | | 10/1964 | Newman et al. | 34/4 |
| 3,455,806 | A | | 7/1969 | Spoor et al. | 204/181 |
| 3,591,767 | A | | 7/1971 | Mudie | 219/354 |
| 3,731,051 | A | | 5/1973 | Ellersick | 219/162 |
| 3,749,657 | A | | 7/1973 | Le Bras et al. | 204/181 |
| 3,953,643 | A | | 4/1976 | Cheung et al. | 428/220 |
| 3,953,644 | A | | 4/1976 | Camelon et al. | 428/220 |
| 3,998,716 | A | | 12/1976 | Masar et al. | 204/181 |
| 4,259,566 | A | | 3/1981 | Kobayashi | 219/222 |
| 4,265,936 | A | | 5/1981 | Prohaska, Jr. | 427/140 |
| 4,336,279 | A | | 6/1982 | Metzger | 427/55 |
| 4,349,724 | A | | 9/1982 | Ellersick | 219/347 |
| 4,389,970 | A | | 6/1983 | Edgerton | 118/666 |
| 4,390,564 | A | | 6/1983 | Kimble | 427/35 |
| 4,403,003 | A | | 9/1983 | Backhouse | 427/407.1 |
| 4,416,068 | A | | 11/1983 | Nilsson et al. | 34/4 |
| 4,423,312 | A | | 12/1983 | Wiedenfeld et al. | 219/388 |
| 4,461,094 | A | | 7/1984 | Schnalke | 34/9 |
| 4,535,548 | A | | 8/1985 | Hyde | 34/4 |
| 4,546,553 | A | | 10/1985 | Best | 34/39 |
| 4,594,266 | A | | 6/1986 | Lemaire et al. | 427/55 |
| 4,731,290 | A | | 3/1988 | Chang | 428/335 |
| 4,771,728 | A | | 9/1988 | Bergman, Jr. | 118/642 |
| 4,820,555 | A | | 4/1989 | Kuwajima et al. | 427/407.1 |
| 4,822,685 | A | | 4/1989 | Perez et al. | 428/423.3 |
| 4,891,111 | A | | 1/1990 | McCollum et al. | 204/181.7 |
| 4,894,261 | A | | 1/1990 | Gulbins et al. | 427/379 |
| 4,907,533 | A | | 3/1990 | Nelson et al. | 118/663 |
| 4,908,231 | A | | 3/1990 | Nelson et al. | 427/55 |
| 4,933,056 | A | | 6/1990 | Corrigan et al. | 204/181.7 |
| 4,943,447 | A | | 7/1990 | Nelson et al. | 427/55 |
| 4,971,837 | A | | 11/1990 | Martz et al. | 422/388.2 |
| 4,988,537 | A | * | 1/1991 | Tanimoto et al. | 427/542 |
| 5,050,232 | A | | 9/1991 | Bergman et al. | 392/412 |
| 5,075,132 | A | | 12/1991 | Ogasawara | 427/55 |
| 5,137,972 | A | | 8/1992 | Cook | 525/123 |
| 5,196,485 | A | | 3/1993 | McMonigal et al. | 525/327.3 |
| 4,546,553 | A | | 4/1993 | Best | 34/39 |
| 5,323,485 | A | | 6/1994 | Josefsson et al. | 392/417 |
| 5,335,308 | A | | 8/1994 | Sorensen | 392/412 |
| 5,338,578 | A | | 8/1994 | Leach | 427/470 |
| 5,340,089 | A | | 8/1994 | Heath et al. | 266/87 |
| RE34,730 | E | | 9/1994 | Salatin et al. | 427/407.1 |
| 5,401,790 | A | | 3/1995 | Poole et al. | 524/199 |
| 5,407,747 | A | | 4/1995 | Sammel et al. | 428/418 |
| 5,425,970 | A | | 6/1995 | Lahrmann et al. | 427/493 |
| 5,427,822 | A | | 6/1995 | Bracciano | 427/424 |
| 5,453,295 | A | | 9/1995 | Sammel et al. | 427/195 |
| 5,486,384 | A | | 1/1996 | Bastian et al. | 427/493 |
| 5,492,731 | A | | 2/1996 | Temple et al. | 427/407.1 |
| 5,551,670 | A | | 9/1996 | Heath et al. | 266/87 |
| 5,556,527 | A | | 9/1996 | Igarashi et al. | 204/488 |
| 5,612,095 | A | | 3/1997 | Brock et al. | 427/407.1 |
| 5,614,271 | A | | 3/1997 | Shibuya et al. | 427/541 |
| 5,635,302 | A | | 6/1997 | Budde et al. | 428/461 |
| 5,654,037 | A | | 8/1997 | Moore et al. | 427/379 |
| 5,698,310 | A | | 12/1997 | Nakamura et al. | 428/328 |
| 5,709,909 | A | | 1/1998 | Leibfarth et al. | 427/407.1 |
| 5,716,678 | A | | 2/1998 | Rockrath et al. | 427/407.1 |
| 5,760,107 | A | | 6/1998 | Valko et al. | 523/404 |
| 5,820,933 | A | | 10/1998 | Carroll | 427/314 |
| 5,820,987 | A | | 10/1998 | Kaufman et al. | 428/413 |
| 5,871,809 | A | | 2/1999 | Liedtke et al. | 427/140 |
| 5,888,592 | A | * | 3/1999 | Biallas et al. | 427/542 |

OTHER PUBLICATIONS

"Heated Flash Technical Specifications", General Motors NAO Paint General Technical Specifications Document No. 34909 (Jan. 14, 1997).

"Specifications for Heated Flash Off for Water–Borne Basecoat Application", Ford Motor Co. Body and Assembly Operations Sec. 240 (Jan. 15, 1995).

"The Proof Is In The Heating", Industrial Energy Efficiency Centre, U.K., HQ4ID (Apr. 25, 1995).

R. Hampshire "The Use of Radiant Heat Transfer in the Curing of Coatings on Complex Geometrics and Problematic Substrates", Interfinish 1996 World Congress, Birmingham, UK (Sep. 1996).

W. Veenstra et al., "IRK Halogen Infrared Radiators in the Industrial Heating Process", Philips Lighting, Eindhoven, Netherlands no date.

"Powder Coatings", Blasdel Equipment Infrared Ovens http://blasdelent,com/powder.html (Mar. 12, 1999).

"Gas Infrared Ovens", Thermovation Engineering Inc. http://www.thomasregister.com/olc/thermovation/gas.htm (Mar. 12, 1999).

"Combination Ovens for Curing of Powder Coatings", IUT no date.

* cited by examiner

MULTI-STAGE PROCESSES FOR COATING SUBSTRATES WITH LIQUID BASECOAT AND POWDER TOPCOAT

CROSS-REFERENCE TO RELATED APPLICATIONS

This patent application is a continuation-in-part of U.S. patent application Ser. No. 09/320,264 now U.S. Pat. No. 6,221,441 filed May 26, 1999 entitled "Multi-Stage Processes for Coating Substrates with Liquid Basecoat and Powder Topcoat". This patent application is also related to U.S. patent application Ser. No. 09/320,265 now U.S. Pat. No. 6,291,027 entitled "Multi-Stage Processes for Coating Substrates with Liquid Basecoat and Liquid Topcoat"; U.S. patent application Ser. No. 09/320,483 entitled "Processes for Coating a Metal Substrate with an Electrodeposited Coating Composition and Drying the Same", now U.S. Pat. No. 6,113,764; U.S. patent application Ser. No. 09/320,484 entitled "Processes For Drying and Curing Primer Coating Compositions", now U.S. Pat. No. 6,200,650; and U.S. patent application Ser. No. 09/320,522 now U.S. Pat. No. 6,231,932 entitled "Processes For Drying Topcoats And Multicomponent Composite Coatings On Metal And Polymeric Substrates", all of Donaldson J. Emch.

FIELD OF THE INVENTION

The present invention relates to drying of liquid basecoats for automotive coating applications and, more particularly, to multi-stage processes for drying a liquid basecoat which include a combination of infrared radiation and convection drying for subsequent powder topcoat application.

BACKGROUND OF THE INVENTION

Today's automobile bodies are treated with multiple layers of coatings which not only enhance the appearance of the automobile, but also provide protection from corrosion, chipping, ultraviolet light, acid rain and other environmental conditions which can deteriorate the coating appearance and underlying car body.

The formulations of these coatings can vary widely. However, a major challenge that faces all automotive manufacturers is how to rapidly dry and cure these coatings with minimal capital investment and floor space, which is valued at a premium in manufacturing plants.

Various ideas have been proposed to speed up drying and curing processes for automobile coatings, such as hot air convection drying. While hot air drying is rapid, a skin can form on the surface of the coating which impedes the escape of volatiles from the coating composition and causes pops, bubbles or blisters which ruin the appearance of the dried coating.

Other methods and apparatus for drying and curing a coating applied to an automobile body are disclosed in U.S. Pat. Nos. 4,771,728; 4,907,533; 4,908,231 and 4,943,447 in which the automobile body is heated with radiant heat for a time sufficient to set the coating on Class A surfaces of the body and subsequently cured with heated air.

U.S. Pat. No. 4,416,068 discloses a method and apparatus for accelerating the drying and curing of refinish coatings for automobiles using infrared radiation. Ventilation air used to protect the infrared radiators from solvent vapors is discharged as a laminar flow over the car body. FIG. 15 is a graph of temperature as a function of time showing the preferred high temperature/short drying time curve 122 versus conventional infrared drying (curve 113) and convection drying (curve 114). Such rapid, high temperature drying techniques can be undesirable because a skin can form on the surface of the coating that can cause pops, bubbles or blisters, as discussed above.

U.S. Pat. No. 4,336,279 discloses a process and apparatus for drying automobile coatings using direct radiant energy, a majority of which has a wavelength greater than 5 microns. Heated air is circulated under turbulent conditions against the back sides of the walls of the heating chamber to provide the radiant heat. Then, the heated air is circulated as a generally laminar flow along the inner sides of the walls to maintain the temperature of the walls and remove volatiles from the drying chamber. As discussed at column 7, lines 18–22, air movement is maintained at a minimum in the central portion of the inner chamber in which the automobile body is dried.

A rapid, multi-stage drying process for automobile coatings is needed which inhibits formation of surface defects and discoloration in the coating, particularly for use with liquid basecoats to be overcoated with powder topcoat.

SUMMARY OF THE INVENTION

The present invention provides a process for coating a metal substrate, comprising the steps of: (a) applying a liquid basecoating composition to a surface of the metal substrate; (b) applying a first infrared radiation at a power density of 30 kilowatts per meter squared or less and a first air simultaneously to the basecoating composition for a first period of at least about 30 seconds, a first velocity of the air at the surface of the basecoating composition being about 4 meters per second or less, a first temperature of the metal substrate being increased at a first rate ranging from about 0.05° C. per second to about 0.3° C. per second to achieve a first peak metal temperature ranging from about 30° C. to about 60° C., such that a pre-dried basecoat is formed upon the surface of the metal substrate; (c) applying a second infrared radiation and a second air simultaneously to the basecoating composition for a second period of at least about 15 seconds, a second velocity of the air at the surface of the basecoating composition being about 4 meters per second or less, a second temperature of the metal substrate being increased at a second rate ranging from about 0.4° C. per second to about 1.2° C. per second to achieve a second peak metal temperature of the substrate ranging from about 60° C. to about 80° C., such that a dried basecoat is formed upon the surface of the metal substrate; and (d) applying a powder topcoating composition over the dried basecoat.

Another aspect of the present invention is a process for coating a metal substrate, comprising the steps of: (a) applying a liquid basecoating composition to a surface of the metal substrate; (b) applying a first air to the basecoating composition for a first period of at least about 1 minute to volatilize at least a portion of volatile material from the liquid basecoating composition, the air at a surface of the basecoating composition having a first velocity that is about 0.5 meters per second or less; (c) applying a first infrared radiation at a power density of 30 kilowatts per meter squared or less and a second air simultaneously to the basecoating composition for a second period of at least about 30 seconds, a second velocity of the air at the surface of the basecoating composition being about 4 meters per second or less, a first temperature of the metal substrate being increased at a first rate ranging from about 0.05° C. per second to about 0.3° C. per second to achieve a first peak metal temperature ranging from about 30° C. to about 60° C., such that a pre-dried basecoat is formed upon the surface of the metal substrate; (d) applying a second infrared radiation and a third air simultaneously to the basecoating composition for a third period of at least about 15 seconds, a third velocity of the air at the surface of the basecoating composition being about 4 meters per second or less, a second temperature of the metal substrate being increased at a second rate ranging from about 0.4° C. per second to about 1.2° C. per second to achieve a second peak metal temperature of the substrate ranging from about 60° C. to about 80° C., such that a dried basecoat is formed upon the surface of the metal substrate; and (e) applying a powder topcoating composition over the dried basecoat.

Yet another aspect of the present invention is a process for coating a polymeric substrate, comprising the steps of: (a) applying a liquid basecoating composition to a surface of the polymeric substrate; (b) applying a first infrared radiation at a power density of 30 kilowatts per meter squared or less and a first air simultaneously to the basecoating composition for a first period of at least about 30 seconds, a first velocity of the air at the surface of the basecoating composition being about 4 meters per second or less, a first temperature of the polymeric substrate being increased at a first rate ranging from about 0.05° C. per second to about 0.3° C. per second to achieve a first peak polymeric temperature ranging from about 30° C. to about 60° C., such that a pre-dried basecoat is formed upon the surface of the polymeric substrate; (c) applying a second infrared radiation and a second air simultaneously to the basecoating composition for a second period of at least about 15 seconds, a second velocity of the air at the surface of the basecoating composition being about 4 meters per second or less, a second temperature of the polymeric substrate being increased at a second rate ranging from about 0.4° C. per second to about 1.2° C. per second to achieve a second peak polymeric temperature of the substrate ranging from about 60° C. to about 80° C., such that a dried basecoat is formed upon the surface of the polymeric substrate; and (d) applying a powder topcoating composition over the dried basecoat.

Another aspect of the present invention is a process for coating a polymeric substrate, comprising the steps of: (a) applying a liquid basecoating composition to a surface of the polymeric substrate; (b) applying a first air to the basecoating composition for a first period of at least about 1 minute to volatilize at least a portion of volatile material from the liquid basecoating composition, the air at a surface of the basecoating composition having a first velocity of about 0.5 meters per second or less; (c) applying a first infrared radiation at a power density of 30 kilowatts per meter squared or less and a second air simultaneously to the basecoating composition for a second period of at least about 30 seconds, a second velocity of the air at the surface of the basecoating composition being about 4 meters per second or less, a first temperature of the polymeric substrate being increased at a first rate ranging from about 0.05° C. per second to about 0.3° C. per second to achieve a first peak polymeric temperature ranging from about 30° C. to about 60° C., such that a pre-dried basecoat is formed upon the surface of the polymeric substrate; (d) applying a second infrared radiation and a third air simultaneously to the basecoating composition for a third period of at least about 15 seconds, a third velocity of the air at the surface of the basecoating composition being about 4 meters per second or less, a second temperature of the polymeric substrate being increased at a second rate ranging from about 0.4° C. per second to about 1.2° C. per second to achieve a second peak polymeric temperature of the substrate ranging from about 60° C. to about 80° C., such that a dried basecoat is formed upon the surface of the polymeric substrate; and (e) applying a powder topcoating composition over the dried basecoat.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE PREFERRED EMBODIMENTS

Figure 1:
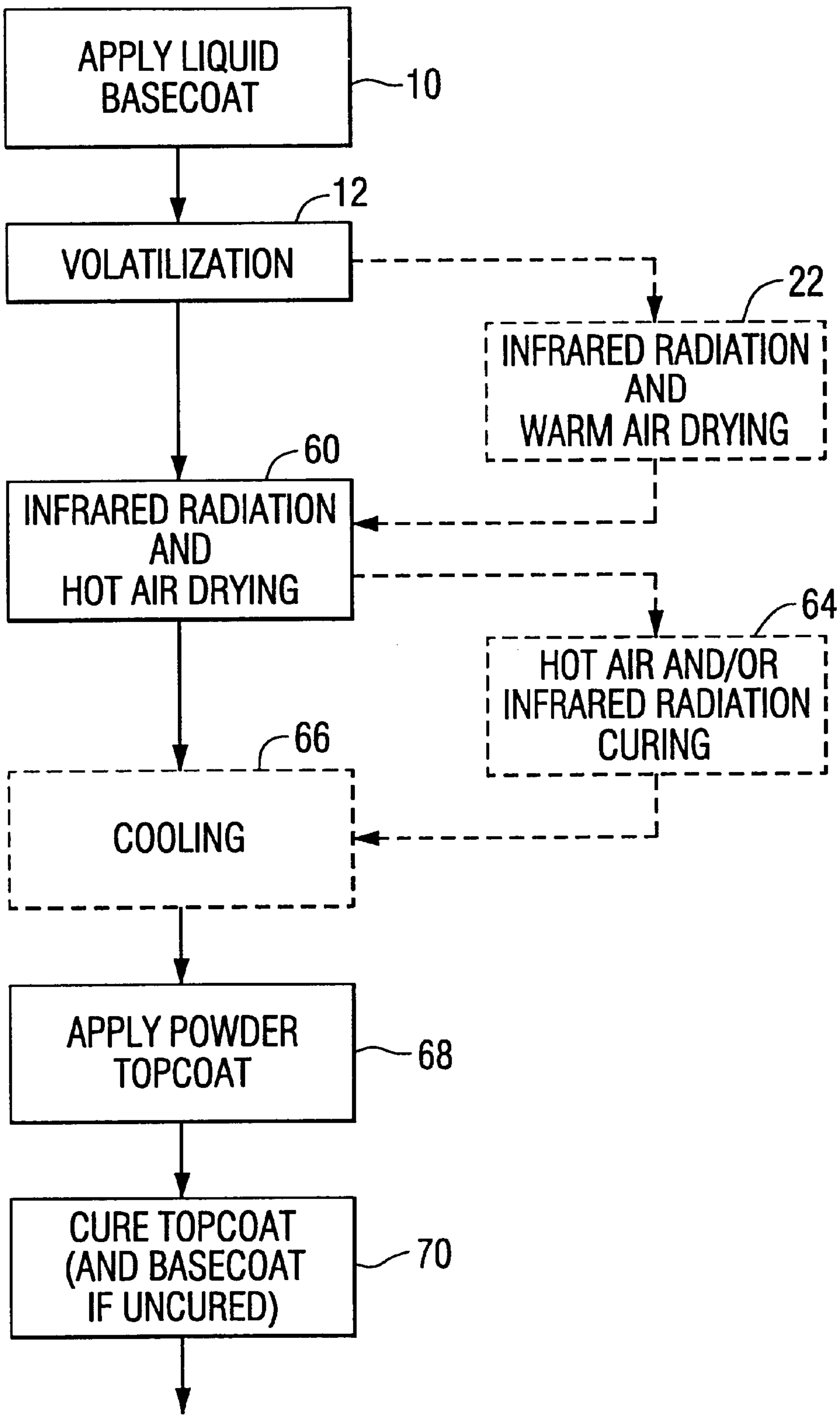
FIG. 1 is a flow diagram of a process for drying liquid basecoat for powder topcoating according to the present invention.

Referring to the drawings, in which like numerals indicate like elements throughout, there is shown in FIG. 1 a flow diagram of a multi-stage process for coating a substrate according to the present invention.

This process is suitable for coating metal or polymeric substrates in a batch or continuous process. In a batch process, the substrate is stationary during each treatment step of the process, whereas in a continuous process the substrate is in continuous movement along an assembly line. The present invention will now be discussed generally in the context of coating a substrate in a continuous assembly line process, although the process also is useful for coating substrates in a batch process.

Useful substrates that can be coated according to the process of the present invention include metal substrates, polymeric substrates, such as thermoset materials and thermoplastic materials, and combinations thereof. Useful metal substrates that can be coated according to the process of the present invention include ferrous metals such as iron, steel, and alloys thereof, non-ferrous metals such as aluminum, zinc, magnesium and alloys thereof, and combinations thereof. Preferably, the substrate is formed from cold rolled steel, electrogalvanized steel such as hot dip electrogalvanized steel or electrogalvanized iron-zinc steel, aluminum or magnesium.

Useful thermoset materials include polyesters, epoxides, phenolics, polyurethanes such as reaction injected molding urethane (RIM) thermoset materials and mixtures thereof. Useful thermoplastic materials include thermoplastic polyolefins such as polyethylene and polypropylene, polyamides such as nylon, thermoplastic polyurethanes, thermoplastic polyesters, acrylic polymers, vinyl polymers, polycarbonates, a crylonitrile-butadiene-styrene (ABS) copolymers, ethylene propylene diene monomer (EPDM) rubber, copolymers and mixtures thereof.

Preferably, the substrates are used as components to fabricate automotive vehicles, including but not limited to automobiles, trucks and tractors. The substrates can have any shape, but are preferably in the form of automotive body components such as bodies (frames), hoods, doors, fenders, bumpers and/or trim for automotive vehicles.

The present invention first will be discussed generally in the context of coating a metallic automobile body. One skilled in the art would understand that the process of the present invention also is useful for coating non-automotive metal and/or polymeric components, which will be discussed below.

Prior to treatment according to the process of the present invention, the metal substrate can be cleaned and degreased and a pretreatment coating, such as CHEMFOS 700 zinc phosphate or BONAZINC zinc-rich pretreatment (each commercially available from PPG Industries, Inc. of Pittsburgh, Pa.), can be deposited upon the surface of the metal substrate. Alternatively or additionally, an electrodepositable coating composition can be electrodeposited upon at least a portion of the metal substrate. Useful electrodeposition methods and electrodepositable coating compositions include conventional anionic or cationic electrodepositable coating compositions, such as epoxy or polyurethane-based coatings discussed in U.S. Pat. Nos. 5,530,043; 5,760,107; 5,820,987 and 4,933,056, which are incorporated herein by reference.

Referring now to FIG. 1, which presents a flow chart of the process of the present invention, a liquid basecoating composition is applied to a surface of the metal substrate (automobile body 16) in a first step 10, preferably over an electrodeposited coating as described above. The liquid basecoating can be applied to the surface of the substrate in step 10 by any suitable coating process well known to those skilled in the art, for example by dip coating, direct roll coating, reverse roll coating, curtain coating, spray coating, brush coating and combinations thereof. The method and apparatus for applying the liquid basecoating composition to the substrate is determined in part by the configuration and type of substrate material.

The liquid basecoating composition comprises a film-forming material or binder, volatile material and optionally pigment. Preferably, the basecoating composition is a crosslinkable coating composition comprising at least one thermosettable film-forming material, such as acrylics, polyesters (including alkyds), polyurethanes and epoxies, and at least one crosslinking material. Thermoplastic film-forming materials such as polyolefins also can be used. The amount of film-forming material in the liquid basecoat generally ranges from about 40 to about 97 weight percent on a basis of total weight solids of the basecoating composition.

Suitable acrylic polymers include copolymers of one or more of acrylic acid, methacrylic acid and alkyl esters thereof, such as methyl methacrylate, ethyl methacrylate, hydroxyethyl methacrylate, butyl methacrylate, ethyl acrylate, hydroxyethyl acrylate, butyl acrylate and 2-ethylhexyl acrylate, optionally together with one or more other polymerizable ethylenically unsaturated monomers including vinyl aromatic compounds such as styrene and vinyl toluene, nitriles such as acrylonitrile and methacrylonitrile, vinyl and vinylidene halides, and vinyl esters such as vinyl acetate. Other suitable acrylics and methods for preparing the same are disclosed in U.S. Pat. No. 5,196,485 at column 11, lines 16–60, which are incorporated herein by reference.

Polyesters and alkyds are other examples of resinous binders useful for preparing the basecoating composition. Such polymers can be prepared in a known manner by condensation of polyhydric alcohols, such as ethylene glycol, propylene glycol, butylene glycol, 1,6-hexylene glycol, neopentyl glycol, trimethylolpropane and pentaerythritol, with polycarboxylic acids such as adipic acid, maleic acid, fumaric acid, phthalic acids, trimellitic acid or drying oil fatty acids.

Polyurethanes also can be used as the resinous binder of the basecoat. Useful polyurethanes include the reaction products of polymeric polyols such as polyester polyols or acrylic polyols with a polyisocyanate, including aromatic diisocyanates such as 4,4'-diphenylmethane diisocyanate, aliphatic diisocyanates such as 1,6-hexamethylene diisocyanate, and cycloaliphatic diisocyanates such as isophorone diisocyanate and 4,4'-methylene-bis(cyclohexyl isocyanate).

Suitable crosslinking materials include aminoplasts, polyisocyanates, polyacids, polyanhydrides and mixtures thereof. Useful aminoplast resins are based on the addition products of formaldehyde, with an amino- or amido-group carrying substance. Condensation products obtained from the reaction of alcohols and formaldehyde with melamine, urea or benzoguanamine are most common. Useful polyisocyanate crosslinking materials include blocked or unblocked polyisocyanates such as those discussed above for preparing the polyurethane. Examples of suitable blocking agents for the polyisocyanates include lower aliphatic alcohols such as methanol, oximes such as methyl ethyl ketoxime and lactams such as caprolactam. The amount of the crosslinking material in the basecoat coating composition generally ranges from about 5 to about 50 weight percent on a basis of total resin solids weight of the basecoat coating composition.

The liquid basecoating composition comprises one or more volatile materials such as water, organic solvents and/or amines. Nonlimiting examples of useful solvents included in the composition, in addition to any provided by other coating components, include aliphatic solvents such as hexane, naphtha, and mineral spirits; aromatic and/or alkylated aromatic solvents such as toluene, xylene, and SOLVESSO 100, commercially available from Imperial Oil, Toronto, Canada; alcohols such as ethyl, methyl, n-propyl, isopropyl, n-butyl, isobutyl and amyl alcohol, and m-pyrol; esters such as ethyl acetate, n-butyl acetate, isobutyl acetate and isobutyl isobutyrate; ketones such as acetone, methyl ethyl ketone, methyl isobutyl ketone, diisobutyl ketone, methyl n-amyl ketone, and isophorone, glycol ethers and glycol ether esters such as ethylene glycol monobutyl ether, diethylene glycol monobutyl ether, ethylene glycol monohexyl ether, propylene glycol monomethyl ether, propylene glycol monopropyl ether, ethylene glycol monobutyl ether acetate, propylene glycol monomethyl ether acetate, and dipropylene glycol monomethyl ether acetate. Useful amines include alkanolamines. The solids content of the liquid basecoating composition generally ranges from about 15 to about 60 weight percent, and preferably about 20 to about 50 weight percent.

The basecoating composition can further comprise one or more pigments or other additives such as UV absorbers, rheology control agents or surfactants. Useful metallic pigments include aluminum flake, bronze flakes, coated mica, nickel flakes, tin flakes, silver flakes, copper flakes and combinations thereof. Other suitable pigments include mica, iron oxides, lead oxides, carbon black, titanium dioxide and colored organic pigments such as phthalocyanines. The specific pigment to binder ratio can vary widely so long as it provides the requisite hiding at the desired film thickness and application solids.

Suitable waterborne basecoats for color-plus-clear composites include those disclosed in U.S. Pat. Nos. 4,403,003; 5,401,790 and 5,071,904, which are incorporated by reference herein. Also, waterborne polyurethanes such as those prepared in accordance with U.S. Pat. No. 4,147,679 can be used as the resinous film former in the basecoat, which is incorporated by reference herein. Suitable film formers for organic solvent-based base coats are disclosed in U.S. Pat. No. 4,220,679 at column 2, line 24 through column 4, line 40 and U.S. Pat. No. 5,196,485 at column 11, line 7 through column 13, line 22, which are incorporated by reference herein.

The thickness of the basecoating composition applied to the substrate can vary based upon such factors as the type of substrate and intended use of the substrate, i.e., the environment in which the substrate is to be placed and the nature of the contacting materials. Generally, the thickness of the basecoating composition applied to the substrate ranges from about 10 to about 38 micrometers, and more preferably about 12 to about 30 micrometers.

Referring now to FIG. 1, after applying the basecoat, the process of the present invention includes a second step 12 of exposing the basecoating composition to low velocity air having a temperature ranging from about 10° C. to about 50° C., and preferably about 20° C. to about 40° C., for a period of at least about 5 minutes (preferably about 5 to about 10 minutes) to volatilize at least a portion of the volatile material from the liquid basecoating composition and set the basecoat.

As used herein, the term "set" means that the basecoat is tack-free (resists adherence of dust and other airborne contaminants) and is not disturbed or marred (waved or rippled) by air currents which blow past the basecoated surface. The velocity of the air at a surface of the basecoating composition is less than about 0.5 meters per second, and preferably ranges from about 0.3 to about 0.5 meters per second. As used herein, the phrase "about (some number) or less" or "less than about (some number)" is meant to be a range wherein the low end of the range is greater than 0.

Figure 2:
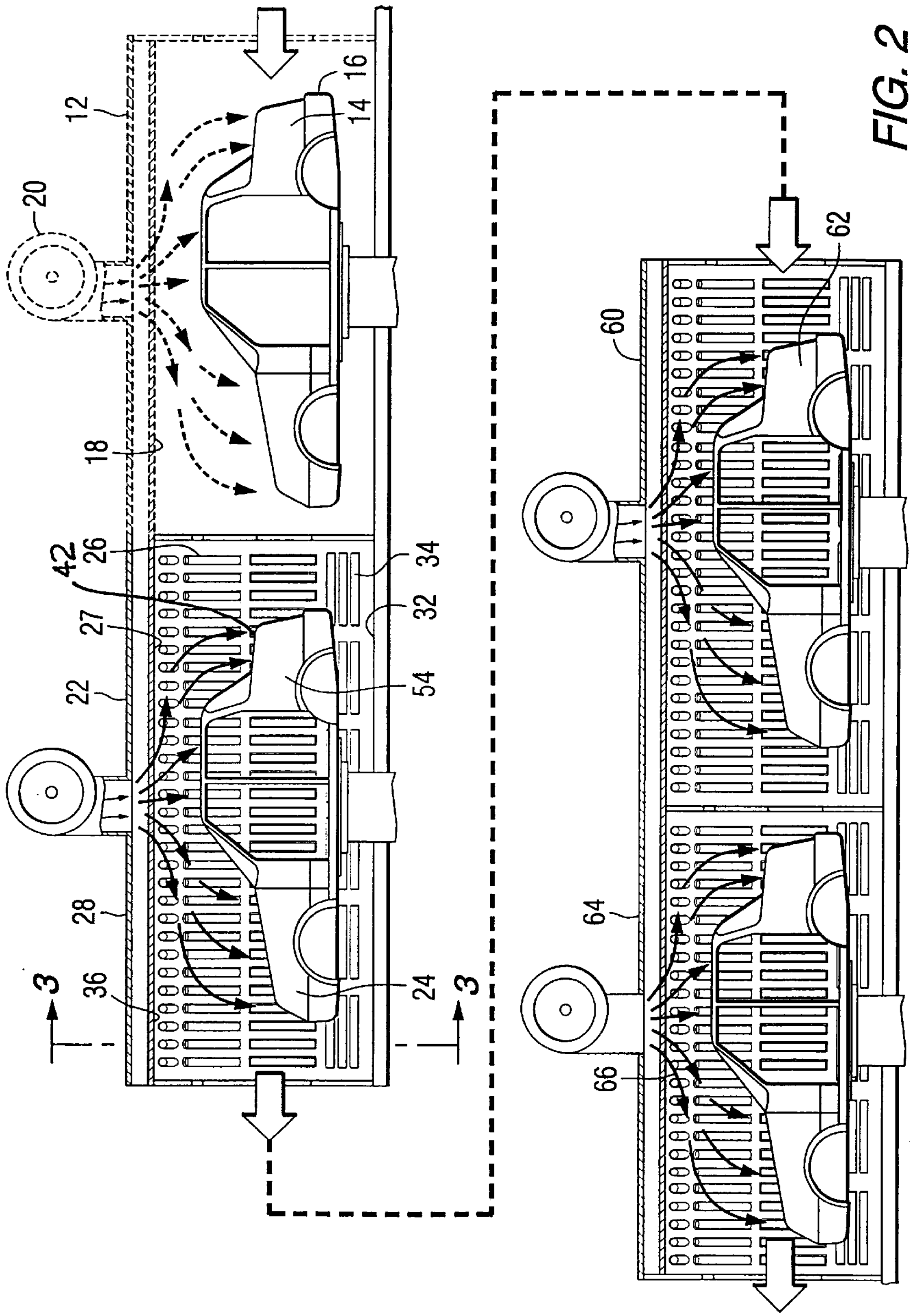
FIG. 2 is a side elevational schematic diagram of a portion of the process of FIG. 1.

The volatilization or evaporation of volatile components from the basecoat surface can be carried out in the open air, but is preferably carried out in a first drying chamber 18 in which air is circulated at low velocity to minimize airborne particle contamination as shown in FIG. 2. The automobile body 16 is positioned at the entrance to the first drying chamber 18 and slowly moved therethrough in assembly-line manner at a rate which permits the volatilization of the basecoat as discussed above. The rate at which the automobile body 16 is moved through the first drying chamber 18 and the other drying chambers discussed below depends in part upon the length and configuration of the drying chamber 18, but preferably ranges from about 3 meters per minute to about 7.3 meters per minute for a continuous process. One skilled in the art would understand that individual dryers can be used for each step of the process or that a single dryer having a plurality of individual drying chambers or sections (shown in FIG. 2) configured to correspond to each step of the process can be used, as desired.

The air preferably is supplied to the first drying chamber 18 by a blower 20 or dryer, shown in phantom in FIG. 2. A non-limiting example of a suitable blower is an ALTIVAR 66 blower that is commercially available from Square D Corporation. The air can be circulated at ambient temperature or heated, if necessary, to the desired temperature range of about 10° C. to about 50° C. Preferably, the basecoating composition is exposed to air for a period ranging from about 5 to about 10 minutes before the automobile body 16 is moved to the next stage of the drying process.

Referring now to FIGS. 1 and 2, the process can further comprise an additional (optional) step 22 (which can be used after step 12 above or in lieu thereof) of applying infrared radiation and low velocity warm air simultaneously to the basecoating composition for a period of at least about 2 minutes such that the temperature of the metal substrate is increased at a rate ranging from about 0.05° C. per second to about 0.3° C. per second to achieve a peak metal temperature ranging from about 30° C. to about 60° C. and form a pre-dried basecoat upon the surface of the metal substrate. By controlling the rate at which the metal temperature is increased and peak metal temperature, flaws in the appearance of the basecoat and topcoat, such as pops and bubbles, can be minimized.

The infrared radiation applied preferably includes near-infrared region (0.7 to 1.5 micrometers) and intermediate-infrared region (1.5 to 20 micrometers) radiation, and more preferably ranges from about 0.7 to about 4 micrometers. The infrared radiation heats the Class A (external) surfaces 24 of the coated substrate which are exposed to the radiation and preferably does not induce chemical reaction or crosslinking of the components of the basecoating. Most non-Class A surfaces are not exposed directly to the infrared radiation but will be heated through conduction through the automobile body and random scattering of the infrared radiation, as well as from hot air convection.

Figure 3:
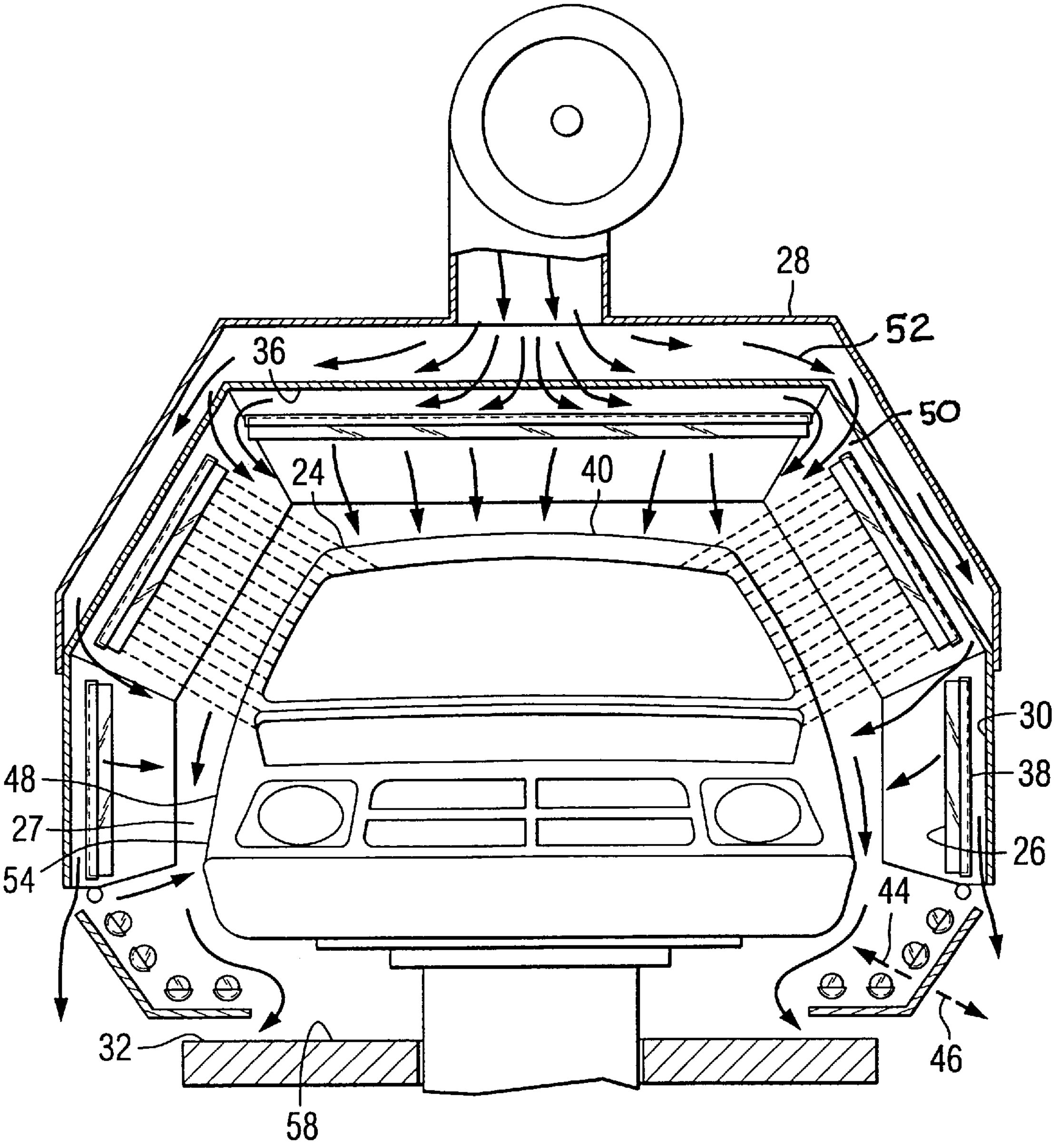
FIG. 3 is a front elevational view taken along line 3—3 of a portion of the schematic diagram of FIG. 2.

Referring now to FIGS. 2 and 3, the infrared radiation is emitted by a plurality of emitters 26 arranged in the interior drying chamber 27 of a combination infrared/convection drying apparatus 28. Each emitter 26 is preferably a high intensity infrared lamp, preferably a quartz envelope lamp having a tungsten filament. Useful short wavelength (0.76 to 2 micrometers), high intensity lamps include Model No. T-3 lamps such as are commercially available from General Electric Co., Sylvania, Phillips, Heraeus and Ushio and have an emission rate of between 75 and 100 watts per lineal inch at the light source. Medium wavelength (2 to 4 micrometers) lamps also can be used and are available from the same suppliers. The emitter lamp is preferably generally rod-shaped and has a length that can be varied to suit the configuration of the oven, but generally is preferably about 0.75 to about 1.5 meters long. Preferably, the emitter lamps on the side walls 30 of the interior drying chamber 27 are arranged generally vertically with reference to ground 32, except for a few rows 34 (preferably about 3 to about 5 rows) of emitters 26 at the bottom of the interior drying chamber 27 which are arranged generally horizontally to ground 32.

The number of emitters 26 can vary depending upon the desired intensity of energy to be emitted. In a preferred embodiment, the number of emitters 26 mounted to the ceiling 36 of the interior drying chamber 27 is about 24 to about 32 arranged in a linear side-by side array with the emitters 26 spaced about 10 to about 20 centimeters apart from center to center, and preferably about 15 centimeters. The width of the interior drying chamber 27 is sufficient to accommodate the automobile body or whatever substrate component is to be dried therein, and preferably is about 2.5 to about 3.0 meters wide. Preferably, each side wall 30 of the chamber 27 has about 50 to about 60 lamps with the lamps spaced about 15 to about 20 centimeters apart from center to center. The length of each side wall 30 is sufficient to encompass the length of the automobile body or whatever substrate component is being dried therein, and preferably is about 4 to about 6 meters. The side wall 30 preferably has four horizontal sections that are angled to conform to the shape of the sides of the automobile body. The top section of the side wall 30 preferably has 24 parallel lamps divided into 6 zones. In one embodiment, the three zones nearest the entrance to the drying chamber 27 are operated at medium wavelengths, the three nearest the exit at short wavelengths. The middle section of the side wall is configured similarly to the top section. The two lower sections of the side walls each preferably contain 6 bulbs in a 2 by 3 array. The first section of bulbs nearest the entrance is preferably operated at medium wavelength and the other two sections at short wavelengths.

Referring to FIG. 2, each of the emitter lamps 26 may be disposed within a trough-shaped reflector 38 that is preferably formed from polished aluminum. Suitable reflectors include aluminum or integral gold-sheathed reflectors that are commercially available from BGK-ITW Automotive, Heraeus and Fannon Products. The reflectors 38 gather energy transmitted from the emitter lamps 26 and focus the energy on the automobile body 16 to lessen energy scattering.

Depending upon such factors as the configuration and positioning of the automobile body 16 within the interior drying chamber 27 and the color of the basecoat to be dried, the emitter lamps 26 can be independently controlled by microprocessor (not shown) such that the emitter lamps 26 furthest from a Class A surface 24 can be illuminated at a greater intensity than lamps closest to a Class A surface 24 to provide uniform heating. For example, as the roof 40 of the automobile body 16 passes beneath a section of emitter lamps 26, the emitter lamps 26 in that zone can be adjusted to a lower intensity until the roof 40 has passed, then the intensity can be increased to heat the deck lid 42 which is at a greater distance from the emitter lamps 26 than the roof 40.

Also, in order to minimize the distance from the emitter lamps 26 to the Class A surfaces 24, the position of the side walls 30 and emitter lamps 26 can be adjusted toward or away from the automobile body as indicated by directional arrows 44, 46, respectively, in FIG. 3. One skilled in the art would understand that the closer the emitter lamps 26 are to the Class A surfaces 24 of the automobile body 16, the greater the percentage of available energy which is applied to heat the surfaces 24 and coatings present thereon. Generally, the infrared radiation is emitted at a power density ranging from about 10 to about 25 kilowatts per square meter ($kW/m^2$) of emitter wall surface, and preferably about 12 $kW/m^2$ for emitter lamps 26 facing the sides 48 of the automobile body 16 (doors or fenders) which are closer than the emitter lamps 26 facing the hood and deck lid 42 of the automobile body 16, which preferably emit about 24 $kW/m^2$. In one embodiment, however, discussed in more detail herein, the infrared radiation is emitted in a first combination infrared/convention zone at a power density of less than about 30 $kW/m^2$, and the infrared radiation is emitted in a second combination infrared/convention zone at a power density of less than about 40 $kW/m^2$.

A non-limiting example of a suitable combination infrared/convection drying apparatus is a BGK combined infrared radiation and heated air convection oven, which is commercially available from BGK Automotive Group of Minneapolis, Minn. The general configuration of this oven will be described below and is disclosed in U.S. Pat. Nos. 4,771,728; 4,907,533; 4,908,231; and 4,943,447, which are hereby incorporated by reference. Other useful combination infrared/convection drying apparatus are commercially available from Durr of Wixom, Mich., Thermal Innovations of Manasquan, N.J., Thermovation Engineering of Cleveland, Ohio, Dry-Quick of Greenburg, Ind. and Wisconsin Oven and Infrared Systems of East Troy, Wis.

Referring now to FIGS. 2 and 3, the preferred combination infrared/convection drying apparatus 28 includes baffled side walls 30 having nozzles or slot openings 50 through which air 52 is passed to enter the interior drying chamber 27 at a velocity of less than about 4 meters per second. During this step, the velocity of the air at the surface 54 of the basecoating composition is less than about 4 meters per second, preferably ranges from about 0.3 to about 4 meters per second and, more preferably, about 0.7 to about 1.5 meters per second.

The temperature of the air 52 generally ranges from about 25° C. to about 50° C., and preferably about 30° C. to about 40° C. The air 52 is supplied by a blower 56 or dryer and can be preheated externally or by passing the air over the heated infrared emitter lamps 26 and their reflectors 38. By passing the air 52 over the emitters 26 and reflectors 38, the working temperature of these parts can be decreased, thereby extending their useful life. Also, undesirable solvent vapors can be removed from the interior drying chamber 27. The air 52 can also be circulated up through the interior drying chamber 27 via the subfloor 58. Preferably, the air flow is recirculated to increase efficiency. A portion of the air flow can be bled off to remove contaminants and supplemented with filtered fresh air to make up for any losses.

The automobile body 16 is heated by the infrared radiation and warm air to a peak metal temperature ranging from about 25° C. to about 60° C., and preferably about 30° C. to about 50° C. As used herein, "peak metal temperature" means the target instantaneous temperature to which the metal substrate (automobile body 16) must be heated. The peak metal temperature for a metal substrate is measured at the surface of the coated substrate approximately in the middle of the side of the substrate opposite the side on which the coating is applied. The peak temperature for a polymeric substrate is measured at the surface of the coated substrate approximately in the middle of the side of the substrate on which the coating is applied. It is preferred that this peak metal temperature be maintained for as short a time as possible to minimize the possibility of crosslinking of the basecoat.

Referring now to FIGS. 1 and 2, the process of the present invention comprises a next step 60 of applying infrared radiation and hot air simultaneously to the basecoating composition on the metal substrate (automobile body 16) for a period of at least about 2 minutes. The temperature of the metal substrate is increased at a rate ranging from about 0.4° C. per second to about 1.2° C. per second to achieve a peak metal temperature of the substrate ranging from about 120° C. to about 165° C. A dried basecoat 62 is formed thereby upon the surface of the metal substrate.

By controlling the rate at which the metal temperature is increased and peak metal temperature, the combination of steps 12 and 60 can provide liquid basecoat and powder topcoat composite coatings with a minimum of flaws in surface appearance, such as pops and bubbles. Also, high film builds can be achieved in a short period of time with minimum energy input and the flexible operating conditions can decrease the need for spot repairs.

The dried basecoat that is formed upon the surface of the automobile body 16 is dried sufficiently to enable application of the topcoat such that the quality of the topcoat will not be affected adversely by further drying of the basecoat. For waterborne basecoats, "dry" means the almost complete absence of water from the basecoat. If too much water is present, the topcoat can crack, bubble or "pop" during drying of the topcoat as water vapor from the basecoat attempts to pass through the topcoat.

This drying step 60 can be carried out in a similar manner to that of step 22 above using a combination infrared radiation/convection drying apparatus, however the heating rate ranges from about 0.4° C. per second to about 1.2° C. per second and peak metal temperature of the substrate ranges from about 120° C. to about 165° C. Preferably, the heating rate ranges from about 0.5° C. per second to about 1.1° C. per second and the peak metal temperature of the substrate ranges from about 132° C. to about 155° C.

The infrared radiation applied preferably includes near-infrared region (0.7 to 1.5 micrometers) and intermediate-infrared region (1.5 to 20 micrometers) radiation, and more preferably ranges from about 0.7 to about 4 micrometers.

The hot drying air preferably has a temperature ranging from about 50° C. to about 110° C., and more preferably about 95° C. to about 110° C. The velocity of the air at the surface of the basecoating composition in drying step 60 is less than about 4 meters per second, and preferably ranges from about 1 to about 4 meters per second. The drying period preferably ranges from about 2 to about 6 minutes.

Drying step 60 can be carried out using any conventional combination infrared/convection drying apparatus such as the BGK combined infrared radiation and heated air convection oven which is described in detail above. The individual emitters 26 can be configured as discussed above and controlled individually or in groups by a microprocessor (not shown) to provide the desired heating and infrared energy transmission rates.

The process of the present invention can further comprise an additional curing step 64 in which hot air 66 is applied to the dried basecoat 62 after step 60 to achieve and hold a peak metal temperature ranging from about 110° C. to about 135° C. for a period of at least about 6 minutes and cure the basecoat. Preferably, a combination of hot air convection drying and infrared radiation is used simultaneously to cure the dried basecoat. As used herein, "cure" means that any crosslinkable components of the dried basecoat are substantially crosslinked.

This curing step 64 can be carried out using a hot air convection dryer, such as are discussed above or in a similar manner to that of step 22 above using a combination infrared radiation/convection drying apparatus, however the peak metal temperature of the substrate ranges from about 110° C. to about 135° C. and the substrate is maintained at the peak metal temperature for at least about 6 minutes, and preferably about 6 to about 20 minutes.

The hot drying air preferably has a temperature ranging from about 110° C. to about 140° C., and more preferably about 120° C. to about 135° C. The velocity of the air at the surface of the basecoating composition in curing step 64 can range from about 4 to about 20 meters per second, and preferably ranges from about 10 to about 20 meters per second.

If a combination of hot air and infrared radiation is used, the infrared radiation applied preferably includes near-infrared region (0.7 to 1.5 micrometers) and intermediate-infrared region (1.5 to 20 micrometers), and more preferably ranges from about 0.7 to about 4 micrometers. Curing step 64 can be carried out using any conventional combination infrared/convection drying apparatus such as the BGK combined infrared radiation and heated air convection oven which is described in detail above. The individual emitters 26 can be configured as discussed above and controlled individually or in groups by a microprocessor (not shown) to provide the desired heating and infrared energy transmission rates.

Referring now to FIG. 1, the process of the present invention can further comprise a cooling step 66 in which the temperature of the automobile body 16 having the dried and/or cured basecoat thereon from steps 60 and/or 64 is cooled, preferably to a temperature ranging from about 20° C. to about 30° C. and, more preferably, about 20° C. to about 25° C. Cooling the basecoated automobile body 16 can facilitate application of the powder topcoat by reducing hot air eddy currents which can disturb even deposition of the powder. The basecoated automobile body 16 can be cooled in air at a temperature ranging from about 15° C. to about 25° C., and preferably about 15° C. to about 20° C. for a period ranging from about 3 to about 6 minutes. Alternatively or additionally, the basecoated automobile body 16 can be cooled by exposure to chilled, saturated air blown onto the surface of the substrate at about 4 to about 10 meters per second to prevent cracking of the coating.

After the basecoating on the automobile body 16 has been dried (and cured and/or cooled, if desired), a powder topcoating composition is applied over the dried basecoat in a powder topcoating step 68. As used herein, a "powder" topcoating composition is meant to include topcoating compositions comprising dry powders and powders that are slurried in a solution, such as water. Suitable powder slurry topcoating compositions include those disclosed in International Publications WO 96/32452 and 96/37561, European Patents 652264 and 714958, and Canadian Patent No. 2,163,831, which are incorporated by reference herein. The powder topcoat can be applied by electrostatic spraying using a gun or bell at 60 to 80 kV, 80 to 120 grams per minute to achieve a film thickness of about 50–90 microns, for example.

Preferably the powder topcoating composition is a crosslinkable coating comprising at least one thermosettable film-forming material and at least one crosslinking material such as are described above. The topcoating composition can include additives such as are discussed above, but generally not pigments. Suitable powder topcoats are described in U.S. Pat. No. 5,663,240 (incorporated by reference herein) and include epoxy functional acrylic copolymers and polycarboxylic acid crosslinking agents. The amount of the topcoating composition applied to the substrate can vary based upon such factors as the type of substrate and intended use of the substrate, i.e., the environment in which the substrate is to be placed and the nature of the contacting materials.

In a preferred embodiment, the process of the present invention further comprises a curing step 70 (shown in FIG. 1) of curing the powder topcoating composition after application over the dried basecoat. The thickness of the dried and crosslinked composite coating is generally about 0.2 to 5 mils (5 to 125 micrometers), and preferably about 0.4 to 4 mils (10 to 100 micrometers). The powder topcoating can be cured by hot air convection drying and, if desired, infrared heating, such that any crosslinkable components of the powder topcoating are crosslinked to such a degree that the automobile industry accepts the coating process as sufficiently complete to transport the coated automobile body without damage to the topcoat. The powder topcoating can be cured using any conventional hot air convection dryer or combination convection/infrared dryer such as are discussed above. Generally, the powder topcoating is heated to a temperature of about 140° C. to about 155° C. for a period of about 25 to about 30 minutes to cure the powder topcoat.

Alternatively, if the basecoat was not cured prior to applying the powder topcoat, both the basecoat and the powder topcoating composition can be cured together by applying hot air convection and/or infrared heating using apparatus such as are described in detail above to cure both the basecoat and the powder coating composition. To cure the basecoat and the powder coating composition, the substrate is generally heated to a temperature of about 140° C. to about 155° C. for a period of about 25 to about 30 minutes to cure the powder topcoat.

Another aspect of the present invention is a process for coating a polymeric substrate. The process includes steps similar to those used for coating a metal substrate above. A liquid basecoating composition is applied to a surface of the polymeric substrate as described above. The basecoating composition is exposed to air having a temperature ranging from about 10° C. to about 50° C. for a period of at least about 5 minutes to volatilize at least a portion of volatile material from the liquid basecoating composition. The velocity of the air at a surface of the basecoating composition is less than about 0.5 meters per second, and preferably ranges from about 0.3 to about 0.5 meters per second. The apparatus used to volatilize the basecoat can be the same as that used to volatilize the basecoat for the metal substrate.

The process can further comprise an additional (optional) step (which can be used after the volatilization step above or in lieu thereof) of applying infrared radiation and low velocity warm air simultaneously to the basecoating composition for a period of at least about 2 minutes such that the temperature of the metal substrate is increased at a rate ranging from about 0.05° C. per second to about 0.3° C. per second to achieve a peak metal temperature ranging from about 30° C. to about 60° C. and form a pre-dried basecoat upon the surface of the metal substrate.

Infrared radiation and hot air are applied simultaneously to the basecoating composition for a period of at least about 2 minutes and preferably about 2 to about 3 minutes. The velocity of the air at the surface of the basecoating composition is less than about 4 meters per second, and preferably ranges from about 1.5 to about 2.5 meters per second. The temperature of the polymeric substrate is increased at a rate ranging from about 0.4° C. per second to about 1.2° C. per second to achieve a peak polymeric substrate temperature ranging from about 120° C. to about 165° C., such that a dried basecoat is formed upon the surface of the polymeric substrate. The apparatus used to dry the basecoat can be the same combined infrared/hot air convection apparatus such as is discussed above for treating the metal substrate. The basecoat can be cured, if desired, before the powder topcoating is applied.

The basecoated polymeric substrate is preferably cooled to a temperature of about 20° C. to about 25° C. before the powder topcoating composition is applied over the dried basecoat. Suitable powder topcoating compositions and methods of applying the same are discussed in detail above for coating the metal substrate.

Another aspect of the present invention is a process for coating a metal substrate including steps similar to those for coating a metal substrate above. The liquid base coating composition is applied to a surface of the metal substrate, as described above.

The process can further comprise an additional (optional) step of applying air to the basecoating composition for a first period of at least about 1 minute to volatilize at least a portion of volatile material from the liquid basecoating composition, the air at a surface of the basecoating composition having a velocity of less than about 0.5 meters per second. The air may be applied to the basecoating composition at a temperature of about 10° C. to about 50° C. Preferably, the relative humidity during this step is maintained at a range of about 30% to about 80%.

Infrared radiation and warm air are applied simultaneously to the basecoating composition for a period of at least about 30 seconds, and preferably about 30 to about 90 seconds. The infrared radiation is applied at a power density of about 30 kilowatts per meter squared or less, preferably about 0.5 to about 30 $kW/m^2$, and the warm air is applied at the surface of the basecoating composition at a velocity of about 4 meters per second or less, preferably about 0.3 to about 4 meters per second. The warm air has a temperature ranging from about 10° C. to about 50° C., and preferably about 20° C. to about 27° C. The temperature of the metal substrate is increased at a rate ranging from about 0.05° C. per second to about 0.3° C. per second to achieve a peak metal temperature ranging from about 30° C. to about 60° C., such that a pre-dried basecoat is formed upon the surface of the metal substrate.

Infrared radiation and hot air are applied simultaneously to the basecoating composition for a period of at least about 15 seconds, and preferably about 15 to about 90 seconds. The infrared radiation is applied at a power density of 40 kilowatts per meter squared or less, preferably about 10 to about 40 $kW/m^2$, and the hot air is applied at the surface of the basecoating composition at a velocity of about 4 meters per second or less, preferably about 0.3 to about 4 meters per second, and more preferably about 1 to about 4 meters per second. The hot air has a temperature ranging from about 50° C. to about 120° C., and preferably about 65° C. to about 100° C. The temperature of the metal substrate is increased at a rate ranging from about 0.4° C. per second to about 1.2° C. per second, preferably about 0.5° C. per second to about 1.1° C. per second, to achieve a second peak metal temperature of the substrate ranging from about 60° C. to about 80° C., preferably about 65° C. to about 77° C., such that a dried basecoat is formed upon the surface of the metal substrate. The apparatus used to dry the basecoat can be the same combined infrared/air convection apparatus such as is discussed above.

The basecoat can be cured, if desired, before the powder topcoating is applied. If desired, the dried basecoat can be cured by applying hot air to he dried basecoat to achieve a peak metal temperature ranging from about 110° C. to about 150° C. for a period of at least about 6 minutes, such that a cured basecoat is formed upon the surface of the metal substrate. Infrared radiation may be applied to the dried basecoat simultaneously while applying the hot air to cure the basecoat.

The basecoated metal substrate is preferably cooled to a temperature of about 20° C. to about 30° C. before the powder topcoating composition is applied over the dried basecoat. Suitable powder topcoating compositions and methods of applying the same are discussed in detail above for coating the metal substrate. The powder topcoating composition may be cured after application over the dried basecoat. Moreover, the basecoating composition and the powder coating composition may be cured after application of the powder topcoating composition over the dried basecoat.

It is contemplated that if a powder slurry is employed as the powder topcoating composition, the powder slurry composition may be dehydrated using the basecoat drying process of the present invention, discussed above.

Some examples and tests results of this embodiment are set forth in Examples 4–6 and in Tables 7–9, hereinbelow.

Another aspect of the present invention is a process for coating a polymeric substrate that includes the same steps and parameters, including the preferred ranges, used for coating a metal substrate discussed immediately above in the previous embodiment. In addition, the optional steps discussed in detail immediately above may also be employed in this embodiment.

In particular, the liquid basecoating composition is applied to the polymeric substrate as described above. Infrared radiation and warm air are simultaneously applied to the basecoating composition for a period of at least about 30 seconds. The infrared radiation is applied to the basecoating composition at a power density of about 30 kilowatts per meter squared or less. The velocity of the air at the surface of the basecoating composition is about 4 meters per second or less. The temperature of the polymeric substrate is increased at a rate ranging from about 0.05° C. per second to about 0.3° C. per second to achieve a peak polymeric temperature ranging from about 30° C. to about 60° C., such that a pre-dried basecoat is formed upon the surface of the polymeric substrate.

Infrared radiation and hot air are simultaneously applied to the basecoating composition for a period of at least about 15 seconds. The velocity of the air at the surface of the basecoating composition is about 4 meters per second or less. The temperature of the polymeric substrate is increased at a rate ranging from about 0.4° C. per second to about 1.2° C. per second to achieve a peak polymeric temperature of the substrate ranging from about 60° C. to about 80° C., such that a dried basecoat is formed upon the surface of the polymeric substrate. Suitable powder topcoating compositions and methods of applying the same are discussed in detail above for coating the metal substrate.

The present invention will be described further by reference to the following examples. The following examples are merely illustrative of the invention and are not intended to be limiting. Unless otherwise indicated, all parts are by weight.

EXAMPLE 1

In this example, steel test panels were coated with a liquid basecoat and powder clearcoat as specified below to evaluate drying processes according to the present invention. The test substrates were cold rolled steel panels, commercially available from ACT Laboratories, Hillsdale, Mich., size 30.48 cm by 45.72 cm (12 inch by 18 inch) electrocoated with a cationically electrodepositable primer commercially available from PPG Industries, Inc. as ED-5000. Commercial waterborne basecoat (HWB 83542 W-1 Stone White which is commercially available from PPG Industries, Inc. of Pittsburgh, Pa.) was spray applied to each of panels 1 and Controls 1–5 (1 coat automated bell spray) at 65% relative humidity and 23° C. to give a dry film thickness as specified in Table 1 below. For Control panel 6, HWB 90394 Bright White basecoat (commercially available from PPG) was applied. The basecoat coatings on the panels were dried as specified in Tables 1A and 1B using a BGK combined infrared radiation and heated air convection oven, which is commercially available from BGK-ITW Automotive Group of Minneapolis, Minn. The panels were then topcoated with PCC10106 powder topcoat (commercially available from PPG) and cured for 30 minutes at 143° C. using hot air convection only to give an overall film thickness as specified in Table 1B.

TABLE 1A

| | Run No. | | | | | | | |
|---|---|---|---|---|---|---|---|---|
| | 1 | | Control 1 | | Control 2 | | Control 3 | |
| | H | V | H | V | H | V | H | V |
| Dry Film Thickness BC (mil) | 1.4–1.6 | | 1.4–1.6 | | 1.4–1.6 | | 1.4–1.6 | |
| FLASH STEP Time (sec) | 30 | | 30 | | 30 | | 30 | |
| SET STEP | | | | | | | | |
| Time (sec) | 180 | | 30 | | 30 | | 60 | |
| IR Watt Density (kW/sq. m) | 2–3 | | 2–3 | | 2–3 | | 2–3 | |
| Average Air Temp. | 87°[001b] C. (188° F.) | | 35° C. (95° F.) | | 60° C. (140° F.) | | 57° C. (134° F.) | |
| Air Flow Rate (m/sec) | 2.0 | | 0.64 | | 2.0 | | 1.3 | |
| Peak Metal Temp. | 48° C. (118° F.) | 59° C. (138° F.) | 23° C. (73° F.) | 23° C. (73° F.) | 30° C. (86° F.) | 37° C. (99° F.) | 28° C. (82° F.) | 32° C. (90° F.) |
| Peak Metal Heating Rate (degrees per second) | 0.14° C. (0.25° F.) | 0.2° C. (0.36° F.) | 0 | 0 | 0.24° C. (0.43° F.) | 0.48° C. (0.86° F.) | 0.08° C. (0.15° F.) | 0.16° C. (0.28° F.) |

| | Run No. | | | | | |
|---|---|---|---|---|---|---|
| | Control 4 | | Control 5 | | Control 6 | |
| | H | V | H | V | H | V |
| Dry Film Thickness BC (mil) | 1.4–1.6 | | 1.7–1.8 | | 1.5 | |
| FLASH STEP Time (sec) | 30 | | 30 | | 300 | |
| SET STEP | | | | | | |
| Time (sec) | 180 | | 180 | | 120 | |
| IR Watt Density (kW/sq. m) | 2–3 | | 2–3 | | — | |
| Average Air Temp. | 81° C. (177° F.) | | 104° C. (220° F.) | | (73° F.) | |
| Air Flow Rate (m/sec) | 0.64 | | 2.0 | | 0.5 | |
| Peak Metal Temp. | 37° C. (99° F.) | 44° C. (111° F.) | 41° C. (106° F.) | 54° C. (129° F.) | — | — |
| Peak Metal Heating Rate (degrees per second) | 0.08° C. (0.14° F.) | 0.12° C. (0.21° F.) | 0.1° C. (0.18° F.) | 0.17° C. (0.31° F.) | — | — |

TABLE 1B

| | Run No. | | | | | | | |
|---|---|---|---|---|---|---|---|---|
| | 1 | | Control 1 | | Control 2 | | Control 3 | |
| | H | V | H | V | H | V | H | V |
| DRYING STEP Time (sec) | 180 | | 180 | | 180 | | 180 | |
| IR Watt Density (kW/sq. m) | 16.5 | 21 | 16.5 | 21 | 16.5 | 8.4 | 16.5 | 8.4 |
| Average Air Temp. | 108° C. (227° F.) | | 73° C. (164° F.) | | 73° C. (164° F.) | | 68° C. (154° F.) | |
| Air Flow Rate (m/sec) | 1.5–2.5 | | 1.5–2.5 | | 1.5–2.5 | | 1.5–2.5 | |
| Peak Metal Temp. | 145° C. (293° F.) | 161° C. (322° F.) | 110° C. (230° F.) | 138° C. (280° F.) | 107° C. (225° F.) | 111° C. (232° F.) | 99° C. (210° F.) | 99° C. (210° F.) |
| Peak Metal Heating Rate (degrees per second) | 0.54° C. (0.97° F.) | 0.57° C. (1.02° F.) | 0.48° C. (0.87° F.) | 0.64° C. (1.15° F.) | 0.43° C. (0.77° F.) | 0.41° C. (0.74° F.) | 0.39° C. (0.71° F.) | 0.37° C. (0.66° F.) |
| Total Dry Film Thickness (mil) | 2.2–2.8 | 2.5–2.7 | 3.2–4.1 | 2.8–3.8 | 2.2–2.3 | 1.8–2.7 | 1.4–2.3 | 1.6–2.5 |

| | Run No. | | | | | |
|---|---|---|---|---|---|---|
| | Control 4 | | Control 5 | | Control 6 | |
| | H | V | H | V | H | V |
| DRYING STEP Time (sec) | 180 | | 180 | | 120 | |
| IR Watt Density (kW/sq. m) | 16.5 | 8.4 | 16.5 | 21 | 16.5 | 21 |
| Average Air Temp. | 87° C. (188° F.) | | 107° C. (225° F.) | | 71–104° C. (160–220° F.) | |
| Air Flow Rate (m/sec) | 1.5–2.5 | | 1.5–2.5 | | 1.5–2.5 | |
| Peak Metal Temp. | 106° C. (223° F.) | 109° C. (228° F.) | 124° C. (255° F.) | 157° C. (315° F.) | 126° C. (259° F.) | — |
| Peak Metal Heating Rate (degrees per second) | 0.38° C. (0.69° F.) | 0.36° C. (0.65° F.) | 0.46° C. (0.83° F.) | 0.57° C. (1.03° F.) | 0.85° C. (1.53° F.) | — |
| Total Dry Film Thickness (mil) | 1.6–2.1 | 2–2.4 | 2.1–2.4 | 2.2–2.6 | 3.0–5.0 | |

The appearance and physical properties of the coated panels were evaluated using the following tests: foil solids and appearance (number of pops, Orange Peel rating and overall rating). The weight percent of foil solids for each sample was determined by measuring the non-volatile coating deposited on a 75 mm by 100 mm foil sheet attached to the sprayed panel. The foil was removed from the panel after the drying process and weighed, then baked until nonvolatiles only are present according to ASTM Method 2369-D at a temperature of 110° C. The number of pops on the surface of the coating of each sample was determined by visual inspection of the entire panel surface. The orange peel rating, specular gloss and Distinction of Image ("DOI") were determined by scanning a 9375 square mm sample of panel surface using an Autospect QMS BP surface quality analyzer device that is commercially available from Perceptron. The Overall Appearance rating was determined by adding 40% of the Orange Peel rating, 20% of the Gloss rating and 40% of the DOI rating. The following Table 2 provides the measured properties.

As shown in Table 2, the coated substrates dried according to the process of the present invention (Run No. 1) generally exhibited less popping, superior orange peel resistance and better overall appearance than the Control panels in which the coatings were not dried by a process according to the present invention.

TABLE 2

| | | | Appearance | | |
|---|---|---|---|---|---|
| Run No. | Horizontal or vertical | Foil Solids (%) | Pops | Orange Peel Rating | Overall Rating |
| 1 | H | 98 | NONE | 71 | 67 |
| | V | 99 | edges | 46 | 58 |
| CONTROL 1 | H | 96 | many | 36 | 35 |
| | V | 99 | micro | 54 | 56 |
| CONTROL 2 | H | 96 | micro | 58 | 62 |
| | V | 98 | on edge | 41 | 52 |
| CONTROL 3 | H | 95 | severe | 16 | 26 |
| | V | 96 | severe | 21 | 38 |
| CONTROL 4 | H | 97 | many | 50 | 56 |
| | V | 98 | many | 28 | 39 |
| CONTROL 5 | H | 98 | edges | 61 | 64 |
| | V | 99 | low ½* | 49 | 59 |
| CONTROL 6 | — | 92.6 | micro | 25 | 27 |

*large number of pops on lower half of panel only due to high film thickness which exceeded 1.6 mil recommended maximum.

EXAMPLE 2

In this example, steel test panels were coated with a liquid basecoat and powder clearcoat as specified below to evaluate drying processes according to the present invention. The test substrates were ACT cold rolled steel panels size 30.48 cm by 45.72 cm (12 inch by 18 inch) electrocoated with a cationically electrodepositable primer commercially available from PPG Industries, Inc. as ED-5000. Each test panel was coated a layer of about 1.2–1.6 mils of Alpine White AF2009300 primer (commercially available from Mehnert and Veck). The primer was heated in a conventional air convection oven for 17 minutes to a peak metal temperature of 155° C. (311° F.). Commercial waterborne basecoat (Alpine White III (300) which is commercially available from BASF Corp. of Parsippany, N.J.) was spray applied (1 coat automated spray at 65% relative humidity and 25+/−3° C. to give a dry film thickness of about 0.8 to 1.0 mils. The basecoat coatings on the panels were dried as specified in Table 3A using a combined infrared radiation and heated air convection oven, which is commercially available from BGK-ITW Automotive Group of Minneapolis, Minn. The panels were then topcoated with 2.6–2.8 mils of PCC10106 powder topcoat (commercially available from PPG Industries, Inc.) and cured for 4.5 minutes ramp to hold for 24 minutes at 145° C. (293° F.) using hot air convection to give an overall film thickness as specified in Table 3B.

The appearance of the coated panels was evaluated using the following tests. Smoothness of the cured powder clearcoats over the basecoat was measured using a Byk Wavescan in which results are reported as long wave and short wave numbers where lower values mean smoother films. Specular gloss at 20° and Distinction of Image (DOI) were measured using an Autospect QMS-BP from Perceptron where higher numbers indicate better performance. Popping was determined by visual observation and rated on a scale of 0 to 5, with 0 indicating no popping and 5 indicating severe popping. The color of the test panel was evaluated at a 45° angle using an X-RITE colorimeter. The Delta L value indicates lightness/darkness. The Delta a value indicates red/green. The Delta b value indicates blue/yellow. The delta E value indicates total color variance. The test results are set forth in Table 4 below in which each reported value represents the results of an average of values for 5 test panels for each run.

TABLE 3A

| | Run No. | | | | | | | | |
|---|---|---|---|---|---|---|---|---|---|
| | 1 | 2 | 3 | 4 | 5 | 6 | 7 | Control 1 | Control 2 |
| FLASH STEP Time (sec) | 30 | 30 | 30 | 30 | 30 | 30 | 30 | 150 | 30 |
| SET STEP | | | | | | | | Infrared only | Infrared only |
| Time (sec) | 180 | 180 | 180 | 180 | 120 | 60 | 60 | 120 | 120 |
| IR Watt Density (kW/sq. m) | 2–3 | 2–3 | 2–3 | 2–3 | 2–3 | 2–3 | 2–3 | 6–8 | 6–8 |
| Average Air Temp. | 87° C. (188° F.) | 102° C. (215° F.) | 107° C. (225° F.) | 91° C. (195° F.) | 88° C. (190° F.) | 73° C. (164° F.) | 71° C. (160° F.) | 88° C. (190° F.) | 88° C. (190° F.) |
| Air Flow Rate (m/sec) | 1.5–2.5 | 1.5–2.5 | 1.5–2.5 | 1.5–2.5 | 1.5–2.5 | 1.5–2.5 | 1.5–2.5 | 1.5–2.5 | 1.5–2.5 |
| Peak Metal Temp. | 46° C. (115° F.) | 51° C. (124° F.) | 53° C. (127° F.) | 44° C. (111° F.) | 38° C. (100° F.) | 36° C. (97° F.) | 34° C. (93° F.) | 75° C. (167° F.) | 60° C. (140° F.) |
| Peak Metal Heating Rate degrees per second | 0.12° C./s (0.22° F./s) | 0.14° C./s (0.25° F./s) | 0.17° C./s (0.31° F./s) | 0.12° C./s (0.22° F./s) | 0.13° C./s (0.24° F./s) | 0.23° C./s (0.42° F./s) | 0.18° C./s (0.33° F./s) | 0.41° C./s (0.73° F./s) | 0.31° C./s (0.55° F./s) |

TABLE 3B

| | Run No. | | | | | | | | |
|---|---|---|---|---|---|---|---|---|---|
| | 1 | 2 | 3 | 4 | 5 | 6 | 7 | Control 1 | Control 2 |
| DRYING STEP | | | | | | | | Convection only | Convection only |
| Time (sec) | 180 | 180 | 120 | 60 | 180 | 180 | 180 | 180 | 180 |
| IR Watt Density (kW/sq. m) Horizontal/Vertical | 16.5/21 | 16.5/21 | 16.5/21 | 16.5/21 | 16.5/21 | 16.5/21 | 16.5/21 | N/A | N/A |
| Average Air Temp. | 93° C. (200° F.) | 93° C. (200° F.) | 93° C. (200° F.) | 93° C. (200° F.) | 93° C. (200° F.) | 93° C. (200° F.) | 93° C. (200° F.) | 66–71° C. (150–160° F.) | 66–71° C. (150–160° F.) |
| Air Flow Rate (m/sec) | 1.5–2.5 | 1.5–2.5 | 1.5–2.5 | 1.5–2.5 | 1.5–2.5 | 1.5–2.5 | 1.5–2.5 | 1.5–2.5 | 1.5–2.5 |
| Peak Metal Temp. | (161° C.) (322° F.) | (145° C.) (293° F.) | (128° C.) (262° F.) | (92° C.) (198° F.) | (135° C.) (275° F.) | (141° C.) (286° F.) | (134° C.) (273° F.) | (69° C.) (157° F.) | (64° C.) (147° F.) |
| Peak Metal Heating Rate degrees per second | (0.64° C./s) (1.15° F./s) | (0.52° C./s) (0.94° F./s) | (0.62° C./s) (1.12° F./s) | (0.81° C./s) (1.45° F./s) | (0.54° C./s) (0.97° F./s) | (0.58° C./s) (1.05° F./s) | (0.56° C./s) (1.00° F./s) | Lost heat −0.06° F./s | (0.02° C./s) (0.04° F./s) |
| Total Dry Film Thickness (mil) | 0.8–1.0 | 0.8–1.0 | 0.8–1.0 | 0.8–1.0 | 0.8–1.0 | 0.8–1.0 | 0.8–1.0 | 0.8–1.0 | 0.8–1.0 |
| Total Drying Time (min) | 6.5 | 6.5 | 5.5 | 4.5 | 5.5 | 4.5 | 4.5 | 7.5 | 5.5 |
| Final weight % solids | 99.26 | 99.05 | 98.81 | 94.85 | 98.90 | 99.30 | 99.18 | 95.07 | 94.15 |

TABLE 4

| | Run No. | | | | | | | | |
|---|---|---|---|---|---|---|---|---|---|
| | 1 | 2 | 3 | 4 | 5 | 6 | 7 | Control 1 | Control 2 |
| BYK Long wave | 3.9 | 2.38 | 2.82 | 2.9 | 2.6 | 2.26 | 2.74 | 6.54 | 5.94 |
| BYK Short wave | 12.66 | 10.42 | 15.14 | 18.74 | 11.68 | 9.66 | 12.46 | 23.62 | 26.02 |
| Gloss of topcoat at 20° | 65.24 | 71.9 | 68.42 | 64.26 | 69.44 | 71.78 | 69.82 | 57.52 | 54.44 |
| DOI of topcoat | 70.96 | 75.98 | 73.32 | 70.4 | 75.38 | 76.12 | 74.84 | 66 | 62.3 |
| Orange Peel | 64.66 | 76.78 | 73.78 | 74.1 | 75.5 | 76.1 | 73.32 | 65.54 | 66.1 |
| Overall appearance | 67.3 | 75.5 | 72.5 | 70.64 | 74.26 | 75.26 | 73.4 | 64.08 | 62.24 |
| Popping | 1 | 1 | 1 | 1 | 1 | 1 | 1 | 1 | 1 |
| COLOR | | | | | | | | | |
| Delta L | −0.598 | −0.652 | −0.684 | −1.17 | −0.612 | −0.63 | −0.68 | −2.1825 | −2.392 |
| Delta a | 0.018 | −0.048 | −0.002 | −0.154 | −0.026 | −0.062 | −0.068 | −0.112 | −0.142 |
| Delta b | −0.144 | 0.078 | 0.158 | 1.026 | 0.042 | 0.15 | 0.276 | 1.676 | 2.13 |
| Delta E | 0.62 | 0.67 | 0.71 | 1.574 | 0.618 | 0.654 | 0.756 | 2.8 | 3.21 |

As shown in Table 4, coated substrates dried according to the process of the present invention (Run Nos. 1–7) exhibited less waviness and better gloss, distinctness of image and less yellowing and color shift as indicated by Δb, ΔE and ΔL values than the Control panels 1 and 2 in which the coatings were not dried by a process according to the present invention.

EXAMPLE 3

In this example, steel test panels were coated with a liquid basecoat and powder clearcoat as specified below to evaluate drying processes according to the present invention. The test substrates were ACT cold rolled steel panels size 30.48 cm by 45.72 cm (12 inch by 18 inch) electrocoated with a cationically electrodepositable primer commercially available from PPG Industries, Inc. as ED-5000. Each test panel was coated a layer of about 1.1–1.2 mils of AF 204 7328 gray primer (commercially available from Mehnert & Veck). The primer was heated in a conventional air convection oven for 17 minutes to a peak metal temperature of 155° C. (311° F.). Commercial water-borne basecoat (354 Titan Silver which is commercially available from BASF Corp. of Parsippany, N.J.) was spray applied (1 coat at 65% relative humidity and 25+/−3° C. to give a dry film thickness of about 0.2 to 0.6 mils. The basecoatings on the panels were dried as specified in Table 5A using a combined infrared radiation and heated air convection oven, which is commercially available from BGK-ITW Automotive Group of Minneapolis, Minn. The panels were then topcoated with 2.6–2.8 mils of PCC10106 powder topcoat (commercially available from PPG Industries, Inc.) and cured for 4.5 minutes ramp to hold for 24 minutes at 145° C. (293° F.) using hot air convection to give an overall film thickness as specified in Table 5B.

The appearance of the coated panels was evaluated using the tests discussed above in Example 2. The test results are set forth in Table 6 below in which each reported value represents the results of an average of values for 5 test panels for each run.

TABLE 5A

| | Run No. | | | | | | | | |
|---|---|---|---|---|---|---|---|---|---|
| | 1 | 2 | 3 | 4 | 5 | 6 | 7 | Control 1 | Control 2 |
| FLASH STEP Time (sec) | 30 | 30 | 30 | 30 | 30 | 30 | 30 | 150 | 30 |
| SET STEP | | | | | | | | Infrared only | Infrared only |
| Time (sec) | 180 | 180 | 180 | 180 | 120 | 60 | 60 | 120 | 120 |
| IR Watt Density (kW/sq. m) | 2–3 | 2–3 | 2–3 | 2–3 | 2–3 | 2–3 | 2–3 | 6–8 | 6–8 |
| Air Temp. | 88° C. (190° F.) | 93° C. (200° F.) | 88° C. (190° F.) | 88° C. (190° F.) | 82° C. (180° F.) | 82° C. (180° F.) | 85° C. (185° F.) | 88° C. (190° F.) | 88° C. (190° F.) |
| Air Flow Rate (m/sec) | 1.5–2.5 | 1.5–2.5 | 1.5–2.5 | 1.5–2.5 | 1.5–2.5 | 1.5–2.5 | 1.5–2.5 | 1.5–2.5 | 1.5–2.5 |
| Peak Metal Temp. | 47° C. (117° F.) | 46° C. (115° F.) | 45° C. (113° F.) | 45° C. (113° F.) | 34° C. (93° F.) | 34° C. (93° F.) | 39° C. (102° F.) | 74° C. (165° F.) | 65° C. (149° F.) |
| Peak Metal Heating Rate degrees per second | 0.12° C./s (0.22° F./s) | 0.12° C./s (0.21° F./s) | 0.11° C./s (0.19° F./s) | 0.12° C./s (0.21° F./s) | 0.11° C./s (0.19° F./s) | 0.12° C./s (0.22° F./s) | 0.11° C./s (0.20° F./s) | 0.32° C./s (0.58° F./s) | 0.32° C./s (0.57° F./s) |

TABLE 5B

| | Run No. | | | | | | | | |
|---|---|---|---|---|---|---|---|---|---|
| | 1 | 2 | 3 | 4 | 5 | 6 | 7 | Control 1 | Control 2 |
| DRYING STEP | | | | | | | | Convection only | Convection only |
| Time (sec) | 180 | 180 | 120 | 60 | 180 | 180 | 180 | 180 | 180 |
| IR Watt Density (kW/sq. m) | 16.5–21 | 16.5–21 | 16.5–21 | 16.5–21 | 16.5–21 | 16.5–21 | 16.5–21 | N/A | N/A |
| Ave. Air Temp. | 93° C. (200° F.) | 93° C. (200° F.) | 93° C. (200° F.) | 93° C. (200° F.) | 93° C. (200° F.) | 93° C. (200° F.) | 93° C. (200° F.) | 66–71° C. (150–160° F.) | 66–71° C. (150–160° F.) |
| Air Flow Rate (m/sec) | 1.5–2.5 | 1.5–2.5 | 1.5–2.5 | 1.5–2.5 | 1.5–2.5 | 1.5–2.5 | 1.5–2.5 | 1.5–2.5 | 1.5–2.5 |
| Peak Metal Temp. | 133° C. (271° F.) | 133° C. (271° F.) | 114° C. (237° F.) | 89° C. (192° F.) | 125° C. (257° F.) | 125° C. (257° F.) | 135° C. (275° F.) | 74° C. (165° F.) | 66° C. (151° F.) |
| Peak Metal Heating Rate degrees per second | 0.48° C./s (0.86° F./s) | 0.48° C./s (0.87° F./s) | 0.57° C./s (1.03° F./s) | 0.73° C./s (1.32° F./s) | 0.51° C./s (0.91° F./s) | 0.51° C./s (0.91° F./s) | 0.53° C./s (0.96° F./s) | Lost heat (−0.02° F./s) | 0.006° C./s (0.01° F./s) |
| Total Dry Film Thickness (mil) | 0.6–0.8 | 0.6–0.8 | 0.6–0.8 | 0.6–0.8 | 0.6–0.8 | 0.6–0.8 | 0.6–0.8 | 0.6–0.8 | 0.6–0.8 |
| Total Drying Time (min) | 6.5 | 6.5 | 5.5 | 4.5 | 5.5 | 4.5 | 4.5 | 7.5 | 5.5 |
| Final weight % solids | 99.38 | 91.7 | 98.96 | 96.80 | 98.12 | 99.36 | 98.93 | 93.30 | 90.15 |

TABLE 6

| | Run No. | | | | | | | | |
|---|---|---|---|---|---|---|---|---|---|
| | 1 | 2 | 3 | 4 | 5 | 6 | 7 | Control 1 | Control 2 |
| BYK Long wave | 2.92 | 2.54 | 2.46 | 2.08 | 2.66 | 2.475 | 2.56 | 2.98 | 2.36 |
| BYK Short wave | 14.44 | 14.84 | 17.14 | 19.04 | 16.46 | 14.65 | 14.16 | 23.5 | 21.48 |
| Gloss of top coat at 20° | 58.84 | 58.58 | 53.62 | 53.04 | 59.1 | 57.22 | 60.22 | 46.88 | 51.16 |
| DOI of topcoat | 65.2 | 65.14 | 61.06 | 60.18 | 65.46 | 63.96 | 66.46 | 55.14 | 58.66 |
| Orange Peel | 70.06 | 69.56 | 69.4 | 73.28 | 71.84 | 69.68 | 71.86 | 67.84 | 71.20 |
| Overall Appearance | 65.86 | 65.62 | 62.9 | 63.98 | 66.74 | 64.92 | 67.38 | 58.56 | 62.18 |
| Popping | 1 | 1 | 1 | 1 | 1 | 1 | 1 | 1 | 1 |
| COLOR | | | | | 25° ANGLE | | | | |
| Delta L | −5.488 | −4.974 | −3.874 | −2.52 | −6.012 | −6.026 | −5.792 | −0.128 | −6.56 |
| Delta a | 0.524 | 0.566 | 0.562 | 0.62 | 0.51 | 0.594 | 0.564 | 0.602 | 0.598 |
| Delta b | 0.348 | 0.296 | 0.148 | 0.246 | 0.32 | 0.128 | 0.258 | 0.4 | 0.328 |
| Delta E | 5.524 | 5.018 | 3.928 | 2.612 | 6.044 | 6.056 | 5.824 | 0.85 | 3.688 |
| COLOR | | | | | 45° ANGLE | | | | |
| Delta L | −1.262 | −1.174 | −2.038 | −2.366 | −1.17 | −1.09 | −1.42 | −2.662 | −2.456 |
| Delta a | 0.37 | 0.378 | 0.38 | 0.47 | 0.366 | 0.354 | 0.386 | 0.44 | 0.476 |
| Delta b | 0.326 | 0.33 | 0.3 | 0.414 | 0.348 | 0.282 | 0.39 | 0.552 | 0.394 |
| Delta E | 1.358 | 1.282 | 2.098 | 2.448 | 1.458 | 1.332 | 1.254 | 2.756 | 2.538 |
| COLOR | | | | | 75° ANGLE | | | | |
| Delta L | 1.542 | 1.288 | 0.106 | −0.564 | 1.924 | 1.74 | 1.718 | −2.164 | −0.088 |
| Delta a | 0.454 | 0.482 | 0.498 | 0.538 | 0.442 | 0.44 | 0.462 | 0.6 | 0.51 |
| Delta b | 0.218 | 0.214 | 0.226 | 0.372 | 0.196 | 0.092 | 0.224 | 0.442 | 0.356 |
| Delta E | 1.636 | 1.408 | 0.886 | 0.884 | 1.994 | 1.812 | 1.802 | 2.296 | 0.656 |

As shown in Table 6, the coated substrates dried according to the process of the present invention (Run No. 1) generally exhibited lower values for BYK short wave, superior gloss and distinctness of image and than the Control panels 1 and 2 in which the coatings were not dried according to the present invention.

EXAMPLE 4

In this example, steel test panels were coated with a liquid basecoat and powder clearcoat as specified below to evaluate drying processes according to the present invention. The test substrates were ACT cold rolled steel panels size 30.48 cm by 45.72 cm (12 inch by 18 inch) electrocoated with a cationically electrodepositable primer commercially available from PPG Industries, Inc. as ED-5000. Commercial waterborne basecoat (Black EV-9517, which is commercially available from PPG Industries, Inc., and Black HWB-9517, which is commercially available from PPG Industries, Inc. was spray applied to give a dry film thickness ("Film BC") as set forth in Table 7 below. The basecoat coatings on the panels were dried as specified in Table 7 using a combined infrared radiation and heated air convection oven, which is commercially available from BGK-ITW Automotive Group of Minneapolis, Minn., with a first infrared/convection period ("Low") and a second infrared/convection period ("High") as set forth below. Some of the panels were then topcoated with PCC10106 powder topcoat (commercially available from PPG Industries, Inc.) to a dry film thickness ("Build CC") set forth below, and cured for 4.5 minutes ramp to hold for 24 minutes at 145° C. (293° F.) using hot air convection.

TABLE 7

| Run No. | Basecoat Material | Clearcoat Material | Low/High (sec) | Peak Metal Temp. | Foil Solids (%) | Film BC (mil) | Build CC (mil) | Base Pass | Autospect Overall |
|---|---|---|---|---|---|---|---|---|---|
| 1 | HWB-9517 | PCC-10106 | 30/60 | H - 149° F. (65° C.) V - 153° F. (67° C.) | H - 89.2 V - 87.2 | H - 0.7 V - 0.6 | H - 2.6–2.6 V - 2.6–3.3 | 15 fpm | H - 66.5 V - 56.0 |
| 2 | EV-9517 | PCC-10106 | 30/60 | H - 171° F. (77° C.) V - 158° F. (70° C.) | H - 90.37 V - 73.10 | H - 0.5–0.6 V - 0.5–0.6 | H - 2.3–2.4 V - 2.3–2.9 | 8 fpm | H - 72.7 V - 59.0 |
| 3 | EV-9517 | PCC-10106 | 90/60 | H - 162° F. (72° C.) V - 154° F. (67° C.) | H - 92.33 V - 65.84 | H - 0.5 V - 0.5 | H - 2.0–2.5 V - 2.4–2.9 | 8 fpm | H - 71.5 V - 62.2 |

As illustrated in Table 7, the process of the present invention substantially reduces the basecoat dehydration times and peak metal temperatures while maintaining good coating properties to the coated substrate. In particular, the process of the present invention reduces the basecoat dehydration times from about 5–6 minutes, as is conventional, to about 90 seconds, while also reducing the peak metal temperatures from about 275–311° F. (135–155° C.) to about 145–165° F. (63–74° C.), while maintaining good overall surface properties and appearance, as illustrated by the overall Autospect results.

EXAMPLE 5

In this example, steel test panels were coated with a liquid basecoat and powder clearcoat as specified below to evaluate drying processes according to the present invention. The test substrates were ACT cold rolled steel panels size 30.48 cm by 45.72 cm (12 inch by 18 inch) electrocoated with a cationically electrodepositable primer commercially available from PPG Industries, Inc. as ED-5000. Commercial waterborne basecoat (Silver GEN3M354, which is commercially available from PPG Industries, Inc., was spray applied to give a dry film thickness ("Film BC") as set forth in Table 8 below. The basecoat coatings on the panels were dried as specified in Table 8 using a combined infrared radiation and heated air convection oven, which is commercially available from BGK-ITW Automotive Group of Minneapolis, Minn., with a first infrared/convection period ("Low") and a second infrared/convection period ("High") as set forth below. The panels were then topcoated via handspraying with PCC10106 powder topcoat (commercially available from PPG Industries, Inc.) to a dry film thickness ("Build CC") set forth below, and cured for 4.5 minutes ramp to hold for 24 minutes at 145° C. (293° F.) using hot air convection.

TABLE 8

| Run No. | Basecoat Material | Clearcoat Material | Low/High (sec) | Peak Metal Temp. | Foil Solids (%) | Film BC (mil) | Build CC (mil) | Base Pass | Autospect Overall |
|---|---|---|---|---|---|---|---|---|---|
| 1 | GEN3M354 | PCC-10106 | 30/60 | H - 142° F. (61° C.) V - 142° F. (61° C.) | H - 86.83 V - 82.54 | H - 0.5 V - 0.5 | H - 2.4–2.6 V - 3.2–3.5 | 1 Pass | H - 62.0 V - 55.4 |
| 2 | GEN3M354 | PCC-10106 | 30/60 | H - 124° F. (51° C.) V - 136° F. (57° C.) | H - 86.94 V - 74.70 | H - 0.5 V - 0.5–0.6 | H - 1.7–2.4 V - 3.3–3.4 | 1 Pass | H - 59.4 V - 51.0 |
| 3 | GEN3M354 | PCC-10106 | 30/60 | H - 122° F. (50° C.) V - 118° F. (47° C.) | H - 63.38 V - 52.56 | H - 1.0–1.1 V - 0.9–1.1 | H - 2.3–3.0 V - 2.8–3.1 | 2 Pass | H - 34.6 V - 49.1 |
| 4 | GEN3M354 | PCC-10106 | 60/60 | H - 147° F. (63° C.) V - 163° F. (72° C.) | H - 88.63 V - 81.78 | H - 0.5–0.6 V - 0.5–0.6 | H - 2.2–2.8 V - 3.1–3.7 | 1 Pass | H - 60.5 V - 52.0 |
| 5 | GEN3M354 | PCC-10106 | 90/60 | H - 167° F. (75° C.) V - 174° F. (78° C.) | H - 93.62 V - 92.10 | H - 0.5 V - 0.5–0.6 | H - 2.2–2.3 V - 2.8–3.2 | 1 Pass | H - 59.2 V - 49.4 |

As shown in Table 8, the process of the present invention substantially reduces the basecoat dehydration times and peak metal temperatures while maintaining good coating properties to the coated substrate. In particular, the process of the present invention reduces the basecoat dehydration times from about 5–6 minutes, as is conventional, to about 90 seconds, while also reducing the peak metal temperatures from about 275–311° F. (135–155° C.) to about 145–165° F. (63–74° C.), while maintaining good overall surface properties and appearance, as illustrated by the overall Autospect results.

EXAMPLE 6

In this example, steel test panels were coated with a liquid basecoat and powder clearcoat as specified below to evaluate drying processes according to the present invention. The test substrates were ACT cold rolled steel panels size 30.48 cm by 45.72 cm (12 inch by 18 inch) electrocoated with a cationically electrodepositable primer commercially available from PPG Industries, Inc. as ED-5000. Commercial waterborne basecoat (Silver MEWB-REFLEX, which is commercially available from PPG Industries, Inc., was spray applied to give a dry film thickness ("Film BC") as set forth in Table 9 below. The basecoat coatings on the panels were dried as specified in Table 9 using a combined infrared radiation and heated air convection oven, which is commercially available from BGK-ITW Automotive Group of Minneapolis, Minn., with a first infrared/convection period ("Low") and a second infrared/convection period ("High")

as set forth below. Some of the panels were then topcoated with PCC10106 powder topcoat (commercially available from PPG Industries, Inc.) to a dry film thickness ("Build CC") set forth below, and cured for 4.5 minutes ramp to hold for 24 minutes at 145° C. (293° F.) using hot air convection.

TABLE 9

| Run No. | Basecoat Material | Clearcoat Material | Low/High (sec) | Peak Metal Temp. | Foil Solids (%) | Film BC (mil) | Build CC (mil) | Base Pass | Autospect Overall |
|---|---|---|---|---|---|---|---|---|---|
| 3 | MEWB-Silver | PCC-10106 | 30/60 | H - 149° F. (65° C.)<br>V - 142° F. (61° C.) | H - 75.85<br>V - 79.26 | H - 0.5<br>V - 0.5 | H - 2.3–2.7<br>V - 3.1–3.9 | 1 Coat | H - 63.0<br>V - 65.6 |
| 5 | MEWB-Silver | PCC-10106 | 60/60 | H - 162° F. (72° C.)<br>V - 174° F. (78° C.) | H - 93.62<br>V - 91.54 | H - 0.5<br>V - 0.5 | H - 2.3–2.6<br>V - 2.5–2.7 | 1 Coat | H - 63.4<br>V - 55.3 |

As shown in Table 9, the process of the present invention substantially reduces the basecoat dehydration times and peak metal temperatures while maintaining good coating properties to the coated substrate. In particular, the process of the present invention reduces the basecoat dehydration times from about 5–6 minutes, as is conventional, to about 90 seconds, while also reducing the peak metal temperatures from about 275–311° F. (135–155° C.) to about 145–165° F. (63–74° C.), while maintaining good overall surface properties and appearance, as illustrated by the overall Autospect results.

The processes of the present invention provide rapid coating of metal and polymeric substrates, can eliminate or reduce the need for long assembly line ovens can drastically reduce overall processing time. Less popping and good flow and appearance of the basecoat, even at higher thicknesses, provides more operating latitude when applying the basecoat which can lower repairs.

In addition, embodiments of the present invention substantially reduce the basecoat dehydration times and peak metal temperatures while maintaining good coating properties to the coated substrate. This is also true where the process of the present invention is employed in the dehydration of clearcoating compositions, where the clearcoating composition is a powder slurry.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

Therefore, I claim:

1. A process for coating a metal substrate, comprising the steps of:

(a) applying a liquid basecoating composition to a surface of the metal substrate;

(b) applying a first infrared radiation at a power density of 30 kilowatts per meter squared or less and a first air simultaneously to the basecoating composition for a first period of about 30 seconds or more, a first velocity of the air at the surface of the basecoating composition being about 4 meters per second or less, a first temperature of the metal substrate being increased at a first rate ranging from about 0.05° C. per second to about 0.3° C. per second to achieve a first peak metal temperature ranging from about 30° C. to about 60° C., such that a pre-dried basecoat is formed upon the surface of the metal substrate;

(c) applying a second infrared radiation and a second air simultaneously to the basecoating composition for a second period of about 15 seconds or more, a second velocity of the air at the surface of the basecoating composition being about 4 meters per second or less, a second temperature of the metal substrate being increased at a second rate ranging from about 0.4° C. per second to about 1.2° C. per second to achieve a second peak metal temperature of the substrate ranging from about 60° C. to about 80° C., such that a dried basecoat is formed upon the surface of the metal substrate; and (d) applying a powder topcoating composition over the dried basecoat.

2. The process according to claim 1, wherein the metal substrate is selected from the group consisting of iron, steel, aluminum, zinc, magnesium, alloys and combinations thereof.

3. The process according to claim 1, wherein the metal substrate is an automotive body component.

4. The process according to claim 1, wherein the volatile material of the liquid basecoating composition comprises water.

5. The process according to claim 1, wherein the volatile material of the liquid basecoating composition is selected from the group consisting of organic solvents and amines.

6. The process according to claim 1, wherein the first air has a first air temperature ranging from about 10° C. to about 50° C. in the step (b).

7. The process according to claim 6, wherein the first air has a first air temperature ranging from about 20° C. to about 27° C. in the step (b).

8. The process according to claim 1, wherein the first period ranges from about 30 seconds to about 90 seconds in the step (b).

9. The process according to claim 1, wherein the first air velocity ranges from about 0.3 meters per second to about 4 meters per second in the step (b).

10. The process according to claim 1, wherein the first infrared radiation is emitted at the power density ranging from about 0.5 to about 30 kilowatts per square meter in the step (b).

11. The process according to claim 1, wherein the first infrared radiation and the second infrared radiation is emitted at a wavelength ranging from about 0.7 to about 20 micrometers in both the steps (b) and (c), respectively.

12. The process according to claim 11, wherein the first infrared radiation and the second infrared radiation is emitted at a wavelength ranging from about 0.7 to about 4 micrometers in both the steps (b) and (c), respectively.

13. The process according to claim 1, wherein the second infrared radiation is emitted at a power density ranging from about 10 to about 40 kilowatts per square meter in the step (c).

14. The process according to claim 1, wherein the second air in the step (c) has a second air temperature ranging from about 50° C. to about 120° C.

15. The process according to claim 14, wherein the second air in the step (c) has a second air temperature ranging from about 65° C. to about 100° C.

16. The process according to claim 1, wherein the second air velocity ranges from about 1 meter per second to about 4 meters per second in the step (c).

17. The process according to claim 1, wherein the second period ranges from about 15 seconds to about 90 seconds in the step (c).

18. The process according to claim 1, wherein the second temperature of the metal substrate is increased at the second rate ranging from about 0.5° C. per second to about 1.1° C. per second in the step (c).

19. The process according to claim 1, wherein the second peak metal temperature of the metal substrate ranges from about 65° C. to about 77° C. in the step (c).

20. The process according to claim 1, further comprising an additional step (a') of applying air having a temperature ranging from about 10° C. to about 50° C. to the basecoating composition for a period of at least about 1 minute between the steps (a) and (b) to volatilize at least a portion of volatile material from the liquid basecoating composition, the air at a surface of the basecoating composition being about 0.5 meters per second or less.

21. The process according to claim 1, further comprising an additional step (c') of applying hot air to the dried basecoat to achieve a peak metal temperature ranging from about 110° C. to about 150° C. for a period of at least about 6 minutes after step (c), such that a cured basecoat is formed upon the surface of the metal substrate.

22. The process according to claim 21, wherein additional step (c') further comprises applying infrared radiation to the dried basecoat simultaneously while applying the hot air.

23. The process according to claim 22, further comprising an additional step (c'') of cooling the metal substrate having the dried basecoat thereon to a temperature of about 20° C. to about 30° C. between steps (c) and (d).

24. The process according to claim 1, further comprising an additional step (e) of curing the powder topcoating composition after application over the dried basecoat.

25. The process according to claim 24, wherein the powder topcoating composition is dehydrated a process comprising the steps (b) and (c).

26. The process according to claim 24, wherein the additional step (e) further comprises curing the basecoating composition and the powder coating composition after application of the powder topcoating composition over the dried basecoat.

27. A process for coating a metal substrate, comprising the steps of:

(a) applying a liquid basecoating composition to a surface of the metal substrate;

(b) applying a first air to the basecoating composition for a first period of about 1 minute or more to volatilize at least a portion of volatile material from the liquid basecoating composition, the air at a surface of the basecoating composition having a first velocity that is about 0.5 meters per second or less;

(c) applying a first infrared radiation at a power density of 30 kilowatts per meter squared or less and a second air simultaneously to the basecoating composition for a second period of about 30 seconds or more, a second velocity of the air at the surface of the basecoating composition being about 4 meters per second or less, a first temperature of the metal substrate being increased at a first rate ranging from about 0.05° C. per second to about 0.3° C. per second to achieve a first peak metal temperature ranging from about 30° C. to about 60° C., such that a pre-dried basecoat is formed upon the surface of the metal substrate;

(d) applying a second infrared radiation and a third air simultaneously to the basecoating composition for a third period of about 15 seconds or more, a third velocity of the air at the surface of the basecoating composition being about 4 meters per second or less, a second temperature of the metal substrate being increased at a second rate ranging from about 0.4° C. per second to about 1.2° C. per second to achieve a second peak metal temperature of the substrate ranging from about 60° C. to about 80° C., such that a dried basecoat is formed upon the surface of the metal substrate; and (e) applying a powder topcoating composition over the dried basecoat.

28. A process for coating a polymeric substrate, comprising the steps of:

(a) applying a liquid basecoating composition to a surface of the polymeric substrate;

(b) applying a first infrared radiation at a power density of 30 kilowatts per meter squared or less and a first air simultaneously to the basecoating composition for a first period of about 30 seconds or more, a first velocity of the air at the surface of the basecoating composition being about 4 meters per second or less, a first temperature of the polymeric substrate being increased at a first rate ranging from about 0.05° C. per second to about 0.3° C. per second to achieve a first peak polymeric temperature ranging from about 30° C. to about 60° C., such that a pre-dried basecoat is formed upon the surface of the polymeric substrate;

(c) applying a second infrared radiation and a second air simultaneously to the basecoating composition for a second period of about 15 seconds or more, a second velocity of the air at the surface of the basecoating composition being about 4 meters per second or less, a second temperature of the polymeric substrate being increased at a second rate ranging from about 0.4° C. per second to about 1.2° C. per second to achieve a second peak polymeric temperature of the substrate ranging from about 60° C. to about 80° C., such that a dried basecoat is formed upon the surface of the polymeric substrate; and (d) applying a powder topcoating composition over the dried basecoat.

29. The process according to claim 28, further comprising an additional step (c'') of cooling the polymeric substrate having the dried basecoat thereon to a temperature of about 20° C. to about 30° C. between steps (c) and (d).

30. The process according to claim 28, further comprising an additional step (e) of curing the powder topcoating composition after application over the dried basecoat.

31. A process for coating a polymeric substrate, comprising the steps of:

(a) applying a liquid basecoating composition to a surface of the polymeric substrate;

(b) applying a first air to the basecoating composition for a first period of about 1 minute or more to volatilize at least a portion of volatile material from the liquid basecoating composition, the air at a surface of the basecoating composition having a first velocity of about 0.5 meters per second or less;

(c) applying a first infrared radiation at a power density of 30 kilowatts per meter squared or less and a second air simultaneously to the basecoating composition for a second period of about 30 seconds or more, a second velocity of the air at the surface of the basecoating composition being about 4 meters per second or less, a first temperature of the polymeric substrate being increased at a first rate ranging from about 0.05° C. per second to about 0.3° C. per second to achieve a first peak polymeric temperature ranging from about 30° C. to about 60° C., such that a pre-dried basecoat is formed upon the surface of the polymeric substrate;

(d) applying a second infrared radiation and a third air simultaneously to the basecoating composition for a third period of about 15 seconds or more, a third velocity of the air at the surface of the basecoating composition being about 4 meters per second or less, a second temperature of the polymeric substrate being increased at a second rate ranging from about 0.4° C. per second to about 1.2° C. per second to achieve a second peak polymeric temperature of the substrate ranging from about 60° C. to about 80° C., such that a dried basecoat is formed upon the surface of the polymeric substrate; and (e) applying a powder topcoating composition over the dried basecoat.

* * * * *

UNITED STATES PATENT AND TRADEMARK OFFICE

CERTIFICATE OF CORRECTION

PATENT NO. : 6,579,575 B2
APPLICATION NO. : 09/840573
DATED : June 17, 2003
INVENTOR(S) : Donaldson J. Emch It is certified that error appears in the above-identified patent and that said Letters Patent is hereby corrected as shown below:

Cover page, first column, line 8, Assignee "Industries Ohio, Inc." should read --PPG Industries Ohio, Inc.--.

Signed and Sealed this

Third Day of October, 2006

JON W. DUDAS
*Director of the United States Patent and Trademark Office*